(12) United States Patent
Dontu et al.

(10) Patent No.: US 7,839,843 B2
(45) Date of Patent: Nov. 23, 2010

(54) DISTRIBUTED FORWARDING IN VIRTUAL NETWORK DEVICES

(75) Inventors: Sitaram Dontu, Sunnyvale, CA (US);
Faisal Mushtaq, Santa Clara, CA (US);
Shreeram Bhide, San Jose, CA (US);
Michael R. Smith, Morgan Hill, CA (US); Ali Golshan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1260 days.

(21) Appl. No.: 10/826,888

(22) Filed: Apr. 16, 2004

(65) Prior Publication Data
US 2005/0163115 A1   Jul. 28, 2005

Related U.S. Application Data

(63) Continuation-in-part of application No. 10/666,306, filed on Sep. 18, 2003.

(51) Int. Cl.
*H04L 12/28* (2006.01)
*H04L 12/56* (2006.01)
*H04J 3/26* (2006.01)

(52) U.S. Cl. .................................. 370/389; 370/432

(58) Field of Classification Search .................. 370/432, 370/256, 389, 254, 400, 401, 411
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A | 10/1991 | Beach et al. | 370/464 |
| 5,371,852 A | 12/1994 | Attanasio et al. | 709/245 |
| 5,473,599 A | 12/1995 | Li et al. | 370/16 |
| 5,822,512 A | 10/1998 | Goodrm et al. | 395/182.11 |

(Continued)

FOREIGN PATENT DOCUMENTS

EP    1 035 685    9/2000    ................. 12/18

(Continued)

OTHER PUBLICATIONS

D.T. Stott, "Layer-2 Path Discovery Using Spanning Tree MIBs", Avaya Labs Research, Avaya, Inc., Mar. 7, 2002, pp. 1-23.

(Continued)

*Primary Examiner*—Chirag G Shah
*Assistant Examiner*—Srinivasa R Reddivalam
(74) *Attorney, Agent, or Firm*—Campbell Stephenson LLP

(57) ABSTRACT

A virtual network device sub-unit includes an interface to a virtual network device link and a distributed forwarding module. The interface receives a packet, and the distributed forwarding module forwards the packet received by the interface. The distributed forwarding module performs an ingress lookup if the packet includes a multicast destination address and an egress lookup if the packet includes a unicast destination address. If the packet includes a multicast destination address, the distributed forwarding module replicates the packet for each of several outgoing VLANs associated with the multicast destination address. If an additional multicast packet is received via an interface that is not coupled to a virtual network device link, the distributed forwarding module sends at most one copy of the additional multicast packet via the virtual network device link.

43 Claims, 14 Drawing Sheets

U.S. PATENT DOCUMENTS

| | | | | |
|---|---|---|---|---|
| 5,825,772 | A | 10/1998 | Dobbins et al. | 370/396 |
| 5,872,783 | A | 2/1999 | Chin | 370/392 |
| 5,959,968 | A | 9/1999 | Chin et al. | 370/216 |
| 5,959,972 | A | 9/1999 | Hamami | 370/228 |
| 5,959,989 | A * | 9/1999 | Gleeson et al. | 370/390 |
| 5,978,852 | A | 11/1999 | Myrick et al. | 709/238 |
| 6,032,194 | A | 2/2000 | Gai et al. | 709/239 |
| 6,058,238 | A | 5/2000 | Ng | 709/223 |
| 6,064,671 | A | 5/2000 | Killian | 370/389 |
| 6,108,300 | A | 8/2000 | Coile et al. | 370/217 |
| 6,163,543 | A | 12/2000 | Chin et al. | 370/400 |
| 6,181,681 | B1 | 1/2001 | Hiscock et al. | 370/279 |
| 6,181,699 | B1 | 1/2001 | Crinion et al. | 370/392 |
| 6,195,351 | B1 | 2/2001 | Hiscock et al. | 370/389 |
| 6,202,114 | B1 | 3/2001 | Dutt et al. | 710/311 |
| 6,222,820 | B1 | 4/2001 | Hamami | 370/218 |
| 6,229,787 | B1 | 5/2001 | Byrne | 370/218 |
| 6,236,659 | B1 | 5/2001 | Pascoe | 370/404 |
| 6,243,360 | B1 | 6/2001 | Basilico | 370/231 |
| 6,275,953 | B1 | 8/2001 | Vahalia et al. | |
| 6,298,061 | B1 | 10/2001 | Chin et al. | 370/400 |
| 6,377,992 | B1 | 4/2002 | Fernandez et al. | |
| 6,388,995 | B1 | 5/2002 | Gai et al. | 370/256 |
| 6,421,787 | B1 | 7/2002 | Slaughter et al. | 714/4 |
| 6,460,088 | B1 | 10/2002 | Merchant | 709/236 |
| 6,487,591 | B1 | 11/2002 | Budhraja et al. | 709/223 |
| 6,519,231 | B1 | 2/2003 | Ding et al. | 370/256 |
| 6,535,490 | B1 | 3/2003 | Jain | 370/256 |
| 6,535,491 | B2 | 3/2003 | Gai et al. | 370/256 |
| 6,567,403 | B1 | 5/2003 | Congdon et al. | 370/389 |
| 6,570,845 | B1 | 5/2003 | Blanc et al. | 370/218 |
| 6,657,973 | B1 | 12/2003 | Arima | 370/254 |
| 6,658,016 | B1 | 12/2003 | Dai et al. | 370/424 |
| 6,674,713 | B1 | 1/2004 | Berg et al. | 370/217 |
| 6,678,241 | B1 | 1/2004 | Gai et al. | 370/216 |
| 6,690,668 | B1 | 2/2004 | Szczepanek et al. | 370/392 |
| 6,697,339 | B1 | 2/2004 | Jain | 370/256 |
| 6,728,780 | B1 | 4/2004 | Hebert | 709/239 |
| 6,735,198 | B1 | 5/2004 | Edsall et al. | 370/389 |
| 6,735,205 | B1 | 5/2004 | Mankude et al. | 370/395.32 |
| 6,738,345 | B1 | 5/2004 | Williamson | 370/217 |
| 6,760,776 | B1 * | 7/2004 | Gallo et al. | 709/238 |
| 6,804,721 | B2 | 10/2004 | Wils et al. | 709/230 |
| 6,810,421 | B1 | 10/2004 | Ishizaki et al. | 709/226 |
| 6,816,467 | B1 | 11/2004 | Muller et al. | 370/256 |
| 6,856,591 | B1 | 2/2005 | Ma et al. | 370/216 |
| 6,938,095 | B2 | 8/2005 | Basturk et al. | 709/238 |
| 7,042,855 | B1 | 5/2006 | Gilchrist et al. | 370/328 |
| 7,061,858 | B1 | 6/2006 | Di Benedetto et al. | 370/219 |
| 7,061,875 | B1 | 6/2006 | Portolani et al. | 370/256 |
| 7,127,633 | B1 | 10/2006 | Olson et al. | 714/4 |
| 7,178,052 | B2 | 2/2007 | Hebbar et al. | 714/4 |
| 7,251,217 | B2 | 7/2007 | Wong et al. | 370/232 |
| 7,286,853 | B2 | 10/2007 | Meier | 455/560 |
| 7,672,228 | B1 | 3/2010 | Senevirathne et al. | 370/219 |
| 2001/0014097 | A1 * | 8/2001 | Beck et al. | 370/401 |
| 2002/0018489 | A1 | 2/2002 | Ambe et al. | 370/475 |
| 2002/0073338 | A1 | 6/2002 | Burrows et al. | 709/224 |
| 2002/0080720 | A1 | 6/2002 | Pegrum et al. | 370/236 |
| 2002/0087716 | A1 | 7/2002 | Mustafa | 709/236 |
| 2002/0089978 | A1 | 7/2002 | Wang et al. | 370/389 |
| 2002/0091755 | A1 | 7/2002 | Narin | 709/203 |
| 2002/0103921 | A1 | 8/2002 | Nair et al. | 709/232 |
| 2002/0110148 | A1 | 8/2002 | Hickman et al. | 370/475 |
| 2002/0126671 | A1 * | 9/2002 | Ellis et al. | 370/390 |
| 2002/0146008 | A1 | 10/2002 | Kaplan | 370/390 |
| 2002/0156612 | A1 | 10/2002 | Schulter et al. | 703/23 |
| 2002/0165981 | A1 | 11/2002 | Basturk et al. | 709/242 |
| 2002/0176450 | A1 | 11/2002 | Kong | 370/539 |
| 2002/0184387 | A1 | 12/2002 | Yamaya et al. | 709/238 |
| 2002/0186654 | A1 | 12/2002 | Tornar | 370/225 |
| 2002/0188711 | A1 | 12/2002 | Meyer et al. | 709/223 |
| 2003/0007489 | A1 | 1/2003 | Krishnan et al. | 370/392 |
| 2003/0026248 | A1 | 2/2003 | Hiroki | 370/352 |
| 2003/0037165 | A1 * | 2/2003 | Shinomiya | 709/238 |
| 2003/0051061 | A1 | 3/2003 | Hank et al. | 709/250 |
| 2003/0061533 | A1 | 3/2003 | Perloff et al. | 714/9 |
| 2003/0093557 | A1 | 5/2003 | Giraud et al. | 709/239 |
| 2003/0097470 | A1 | 5/2003 | Lapuh et al. | 709/239 |
| 2003/0110344 | A1 | 6/2003 | Szczepanek et al. | 711/100 |
| 2003/0142680 | A1 | 7/2003 | Oguchi | 370/400 |
| 2003/0152101 | A1 | 8/2003 | Feng | 370/445 |
| 2003/0169734 | A1 | 9/2003 | Lu et al. | 370/386 |
| 2003/0172147 | A1 | 9/2003 | Chang et al. | 709/223 |
| 2003/0198231 | A1 * | 10/2003 | Kalkunte et al. | 370/395.31 |
| 2004/0057469 | A1 | 3/2004 | Nuss et al. | 370/535 |
| 2004/0066781 | A1 | 4/2004 | Shankar et al. | 370/389 |
| 2004/0078621 | A1 | 4/2004 | Talaugon et al. | 714/4 |
| 2004/0098501 | A1 | 5/2004 | Finn | 709/236 |
| 2004/0105390 | A1 | 6/2004 | Saksio | 370/245 |
| 2004/0156390 | A1 | 8/2004 | Prasad et al. | 370/466 |
| 2004/0179507 | A1 | 9/2004 | Batra et al. | 370/343 |
| 2004/0208116 | A1 | 10/2004 | Saint Etienne et al. | 370/216 |
| 2005/0036488 | A1 | 2/2005 | Kalkunte et al. | 370/389 |
| 2005/0041665 | A1 | 2/2005 | Weyman et al. | 370/390 |
| 2005/0044186 | A1 | 2/2005 | Petrisor | 709/219 |
| 2005/0063395 | A1 | 3/2005 | Smith et al. | 370/399 |
| 2005/0083933 | A1 | 4/2005 | Fine et al. | 370/390 |
| 2005/0089014 | A1 | 4/2005 | Levin et al. | 370/351 |
| 2005/0111483 | A1 | 5/2005 | Cripe et al. | 370/463 |
| 2005/0169311 | A1 | 8/2005 | Miller et al. | 370/471 |
| 2005/0193114 | A1 | 9/2005 | Colby et al. | 709/226 |
| 2005/0198371 | A1 | 9/2005 | Smith et al. | 709/238 |
| 2005/0243826 | A1 | 11/2005 | Smith et al. | 370/392 |
| 2005/0259646 | A1 | 11/2005 | Smith et al. | 370/389 |
| 2005/0265346 | A1 | 12/2005 | Ho et al. | 370/392 |
| 2006/0015643 | A1 | 1/2006 | Orava et al. | 709/238 |
| 2006/0215679 | A1 | 9/2006 | Musoll et al. | 370/412 |
| 2007/0159971 | A1 | 7/2007 | Zhang et al. | 370/230 |
| 2007/0180266 | A1 | 8/2007 | Kang et al. | 713/189 |
| 2009/0080431 | A1 | 3/2009 | Rekhter et al. | 141/26 |
| 2009/0134996 | A1 | 5/2009 | White et al. | 340/538 |

FOREIGN PATENT DOCUMENTS

| | | | | |
|---|---|---|---|---|
| EP | 1 309 135 A1 | 5/2003 | | |
| EP | 1 401 147 | 3/2004 | | 12/26 |
| GB | 2 362 538 | 5/2000 | | |
| WO | WO 00/72531 | 11/2000 | | |
| WO | WO 00/78004 | 12/2000 | | |
| WO | WO 02/01413 | 5/2001 | | |
| WO | WO 02/01413 A1 | 5/2001 | | |
| WO | WO 02/018965 | 7/2002 | | 31/8 |
| WO | WO 03/081451 | 10/2003 | | |
| WO | WO 03/081451 A1 | 10/2003 | | |

OTHER PUBLICATIONS

International Search Report as mailed from the PCT on Mar. 18, 2005, for International Application No. PCT/US2004/034851, 2 pages.

Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification & 11 sheets of drawings.

Cisco Systems, Inc.; Copyright 1989-1997 © http://www.cisco.com/univercd/cc/td/doc/product/rtmgmt/sw_ntman/cwsimain/cwsi2/cwsiug2/vlan2/stpapp.htm "Understanding Spanning-Tree Protocol," Appendix C, pp. C-1 through C-12.

News Release: "Cisco Raises the Bar in Stackable Switching, Introduces Catalyst 3750 Series with Cisco StackWise™ Technology;" 3 pages; http://newsroom.cisco.com/dlls/prod_041503b.html.

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003, see AJ).

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Michael Ward; "802.1S Solves Architecture Issues;" *Network World*, Aug. 4, 2003; 3 pages; http://www.nwfusion.com/cgi-bin/mailto/x.cgi.

Nortel Networks, "Split Multi-link Trunking," http://www.nortelnetworks.com/corporate/technology/smlt, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May 1, 2006, 4 pages.

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

* cited by examiner

Packet in VLAN Blue is not sent via VLB 450(1) and replicated packet in VLAN Green is not sent via VLB 450(2) since already sent by VNDSU 122(1)

Hit non-primary entry for packet's destination address

DISTRIBUTED FORWARDING IN VIRTUAL NETWORK DEVICES

CROSS-REFERENCE TO RELATED APPLICATIONS

This application is a continuation-in-part of U.S. patent application Ser. No. 10/666,306, entitled "Virtual Network Device," filed Sep. 18, 2003, and naming Michael Smith, Ali Golshan, Jeffrey Ym Wang, Neelima Mehta, and Venkatesh Janakiraman as inventors, which is hereby incorporated by reference herein in its entirety.

BACKGROUND OF THE INVENTION

1. Field of the Invention

The present invention relates to networking and, more specifically, to performing distributed forwarding in a virtual network device.

2. Description of the Related Art

In order to provide increased network reliability, redundant switches and links are often included in a network. If a switch or link fails, a redundant switch or link, already in place within the network, is quickly enabled to replace the failed switch or link. Since the redundant switch or link is typically enabled as a replacement more quickly than the failed component can be replaced or repaired, having redundant links and/or switching provides a more reliable network.

When redundant components are included within a network, it is often desirable to be able to use the redundant components during normal network operation, before the failure of corresponding components. For example, if two links are implemented between a pair of switches, it is desirable to use both links (as opposed to leaving one link idle) to provide increased bandwidth. However, if multiple redundant links are active at the same time, management of those links may be undesirably complicated (e.g., due to the need to avoid bridging loops). This complexity extends to other situations in which multiple redundant components are used during normal operation. For example, if multiple redundant routers are simultaneously used in a network, management of the network may become more complicated due to the need to have a different point of management for each network device. As these examples show, it is desirable to be able to reduce the complexities that arise due to the use of multiple redundant components in a network.

SUMMARY OF THE INVENTION

Various embodiments of methods and systems for performing distributed forwarding in virtual network devices are disclosed. A virtual network device includes several different virtual network device sub-units, which collectively operate as a single logical network device.

A method of performing distributed forwarding within a virtual network device involves receiving a packet, which includes a multicast destination address, and sending a copy of the packet to a virtual network device sub-unit via a virtual network device link. At most one copy of the packet is sent via the virtual network device link. The method can also involve receiving a second packet via the virtual network device link. The second packet includes a second multicast destination address. The second packet is replicated in each of several outgoing VLANs (Virtual Local Area Networks) associated with the second multicast destination address.

Another method of performing distributed forwarding within a virtual network device involves receiving a packet via a virtual network device link. The packet includes a unicast destination address. An egress lookup is performed for the packet in response to receiving the packet. If a primary entry corresponding to the unicast destination address is found during the egress lookup, the packet is sent from an interface identified by the primary entry. A header associated with the packet is also received, along with the packet, via the virtual network device link. The header includes a destination identifier. If the destination identifier in the header does not match a destination identifier in the primary entry, an error notification is sent via the virtual network device link. The error notification identifies that the unicast destination address corresponds to the destination identifier in the primary entry.

Yet another method of performing distributed forwarding in a virtual network device involves receiving a packet via a virtual network device link and performing either an ingress lookup and an egress lookup for the packet. The ingress lookup is performed for the packet if the packet includes a multicast destination address. The egress lookup is performed for the packet if the packet includes a unicast destination address.

A system (e.g., a virtual network device sub-unit) includes an interface to a virtual network device link and a distributed forwarding module coupled to the interface. The interface is configured to receive a packet. The distributed forwarding module is configured to forward the packet received by the interface. In one embodiment, the distributed forwarding module is configured to perform an ingress lookup for the packet if the packet includes a multicast destination address and to perform an egress lookup for the packet if the packet includes a unicast destination address.

If the packet includes a multicast destination address, the distributed forwarding module replicates the packet for each of several outgoing VLANs associated with the multicast destination address. The system can also include a second interface (not an interface to a virtual network device link) that is configured to receive a second packet, which includes a second multicast address. The distributed forwarding module is configured to send at most one copy of the second packet via the virtual network device link.

If the packet includes a unicast destination address, the distributed forwarding module sends the packet and a header that is associated with the packet to another line card if a non-primary entry corresponding to the unicast destination address is found during the egress lookup. If a primary entry corresponding to the unicast destination address is found during the egress lookup and the primary entry identifies a second interface, the distributed forwarding module sends the packet from the second interface. The distributed forwarding module is configured to send a notification via the virtual network device link if a destination identifier in the header does not match a destination identifier in the primary entry. The notification identifies that the unicast destination address corresponds to the destination identifier in the primary entry.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
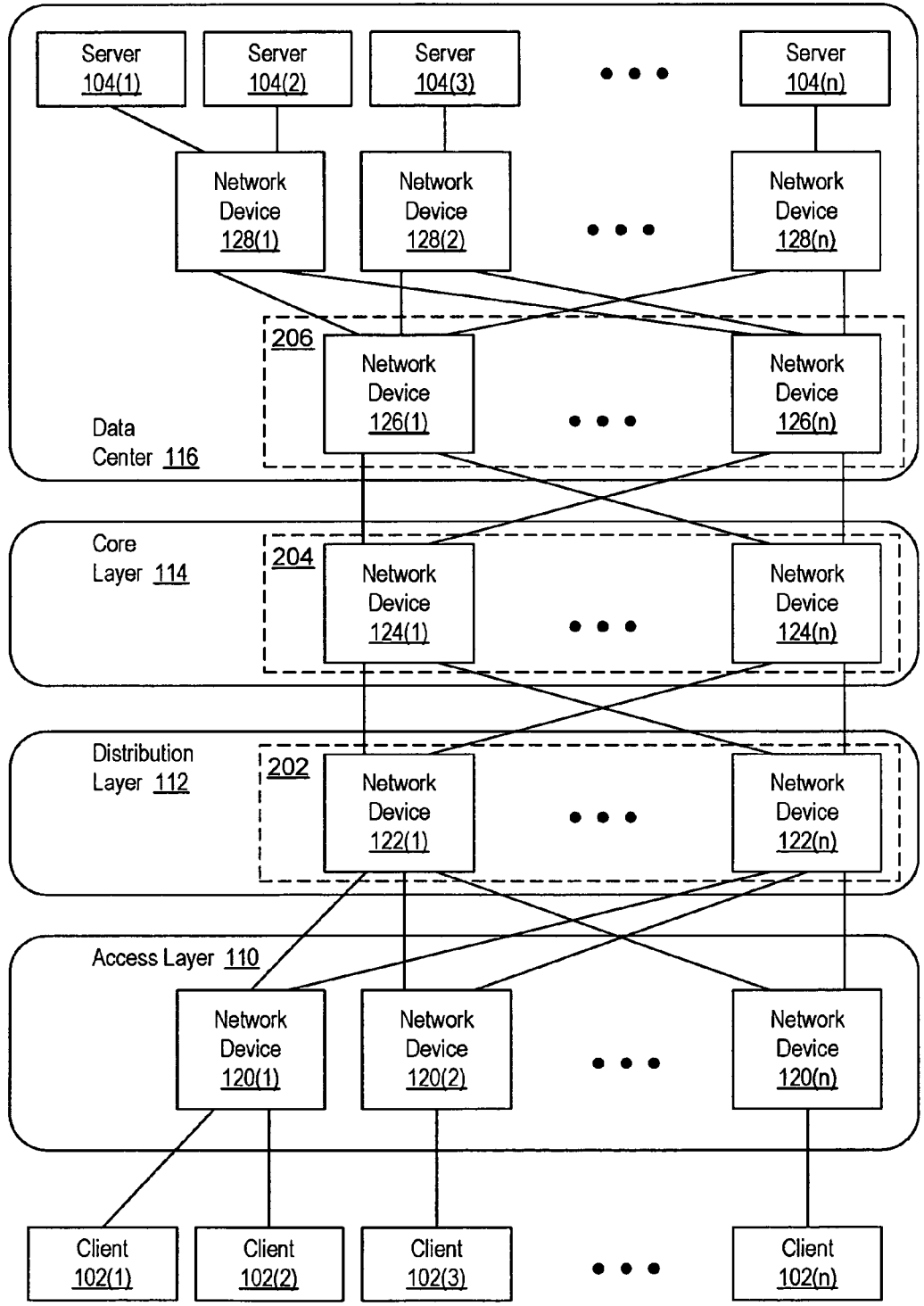
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a network. In FIG. 1, several clients 102(1)-102(n) communicate with each other and with several servers 104(1)-104(n) via a network. Clients 102(1)-102(n) can include a variety of different devices that access networked services. For example, client 102(1) can be a cell phone, client 102(2) can be a personal computer, and client 102(n) can be a Personal Digital Assistant (PDA). Servers 104(1)-104(n) provide various services, such as various software-based services and/or access to shared storage devices.

The network coupling clients 102(1)-102(n) and servers 104(1)-104(n) is described in terms of several network layers. The layer closest to clients 102(1)-102(n) is access layer 110. Access layer 110 includes several network devices 120(1)-120(n). In this example, access layer 110 is the primary layer at which packets enter the network from clients 102(1)-102(n).

Distribution layer 112 aggregates flows received via access layer 110 and provides these aggregated flows to core layer 114. In this example, distribution layer 112 includes network devices 122(1)-122(n). Core layer 114 is a logically centralized portion of the network through which various aggregated flows pass. Core layer 114 includes network devices 124(1)-124(n).

In this example, data center 116 includes two sets of network devices: network devices 126(1)-126(n) and network devices 128(1)-128(n). Network devices 128(1)-128(n) provide access to the network to various servers 104(1)-104(n). Network devices 126(1)-126(n) aggregate flows from network devices 128(1)-128(n) and provide the aggregated flows to core layer 114.

It is noted that in some embodiments, networks will not include the network layers illustrated in FIG. 1 (e.g., some of the layers can be combined and/or eliminated, and alternative layers can also be included in addition to and/or instead of those shown in FIG. 1). Additionally, clients and servers can be coupled to the network differently than shown in FIG. 1 (e.g., some clients and/or servers can be coupled to individual network devices in the core and/or distribution layers). Additionally, the physical locations of devices relative to each other can differ from the logical locations shown in FIG. 1. For example, two devices in the same network layer can be physically located on different floors, in different buildings, or on different campuses. In contrast, two devices in different network layers can be located in the same room.

In some embodiments, network devices 120(1)-120(n) and 128(1)-128(n), which are located at the outer edges of the network, operate differently than network devices 122(1)-122(n), 124(1)-124(n), and 126(1)-126(n), which are located in the inner layers of the network. For example, in one embodiment, network devices 120(1)-120(n) are adjunct network devices that are controlled or otherwise subordinate to network devices in the inner layers (e.g., the distribution and core layers) of the network. In such an embodiments, the non-adjunct network devices provide L2 (Layer 2) and L3 (Layer 3) forwarding and routing, while adjunct network devices only have relatively limited forwarding and/or routing capabilities. In other embodiments, adjunct network devices do not perform any L2 forwarding or L3 routing. Instead, the adjunct network devices simply forward all packets to non-adjunct network devices for L2 forwarding and L3 routing. Non-adjunct network devices coupled to adjunct network devices can, in some embodiments, control the operation of the adjunct network devices. For example, network devices 126(1)-126(n) configure network devices 128(1)-128(n) according to various routing protocols. In some embodiments, adjunct network devices are treated as remote line cards of the network devices to which the adjunct network devices are subordinate. It is also noted that in alternative embodiments, non-adjunct network devices can be used in the access layer and data center instead of adjunct network devices.

Network devices 120(1)-120(n), 122(1)-122(n), 124(1)-124(n), 126(1)-126(n), and 128(1)-128(n) can include various routers, switches, gateways, and other network equipment. In many embodiments, only one network device may be needed at each layer in order for the network to function.

However, multiple network devices can be included at each layer, as shown in FIG. 1, in order to provide redundancy.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Multiple links can be implemented between devices in different network layers to provide additional redundancy. For example, as shown in FIG. 1, each network device 120(1)-120(n) in access layer 110 is coupled to distribution layer 112 by two (or more) different links. Similarly, each network device 122(1)-122(n) in distribution layer 112 is coupled to core layer 114 by two (or more) different links. In one embodiment, each link is an Ethernet link.

Figure 2A:
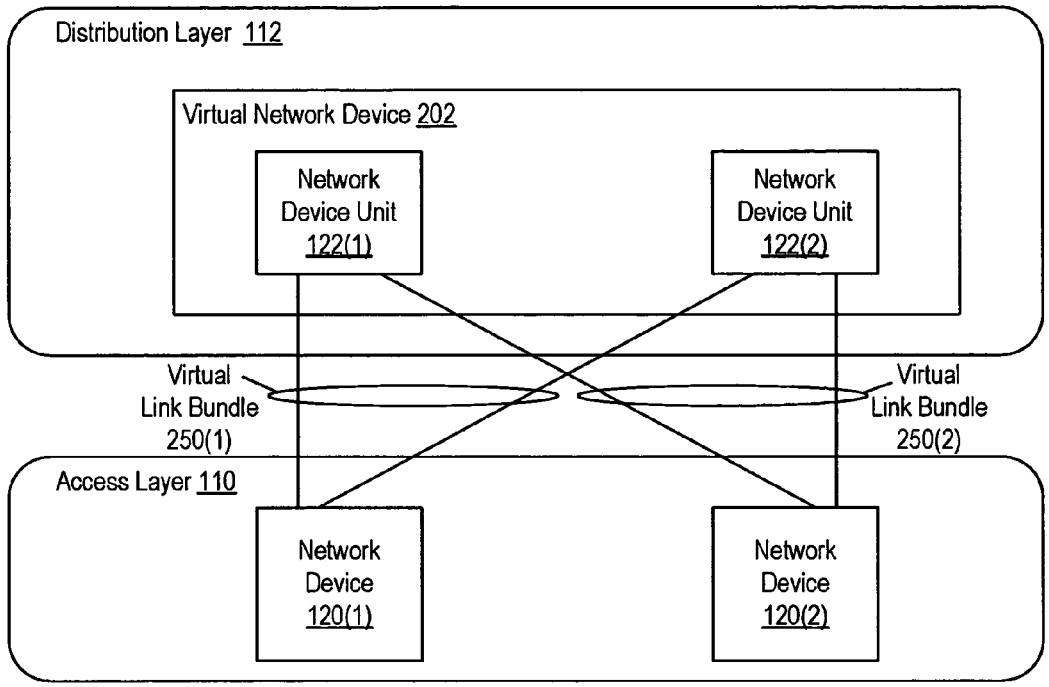
FIGS. 2A and 2B show how two network devices in the same network layer collectively operate as a single virtual network device, according to one embodiment of the present invention.
Figure 2B:
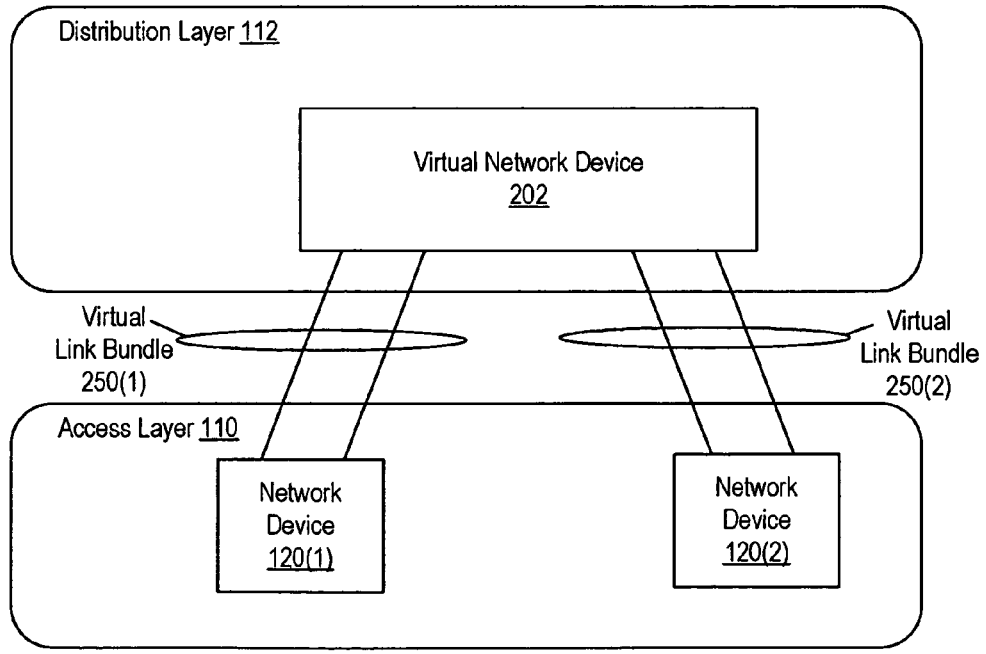
Figure 3:
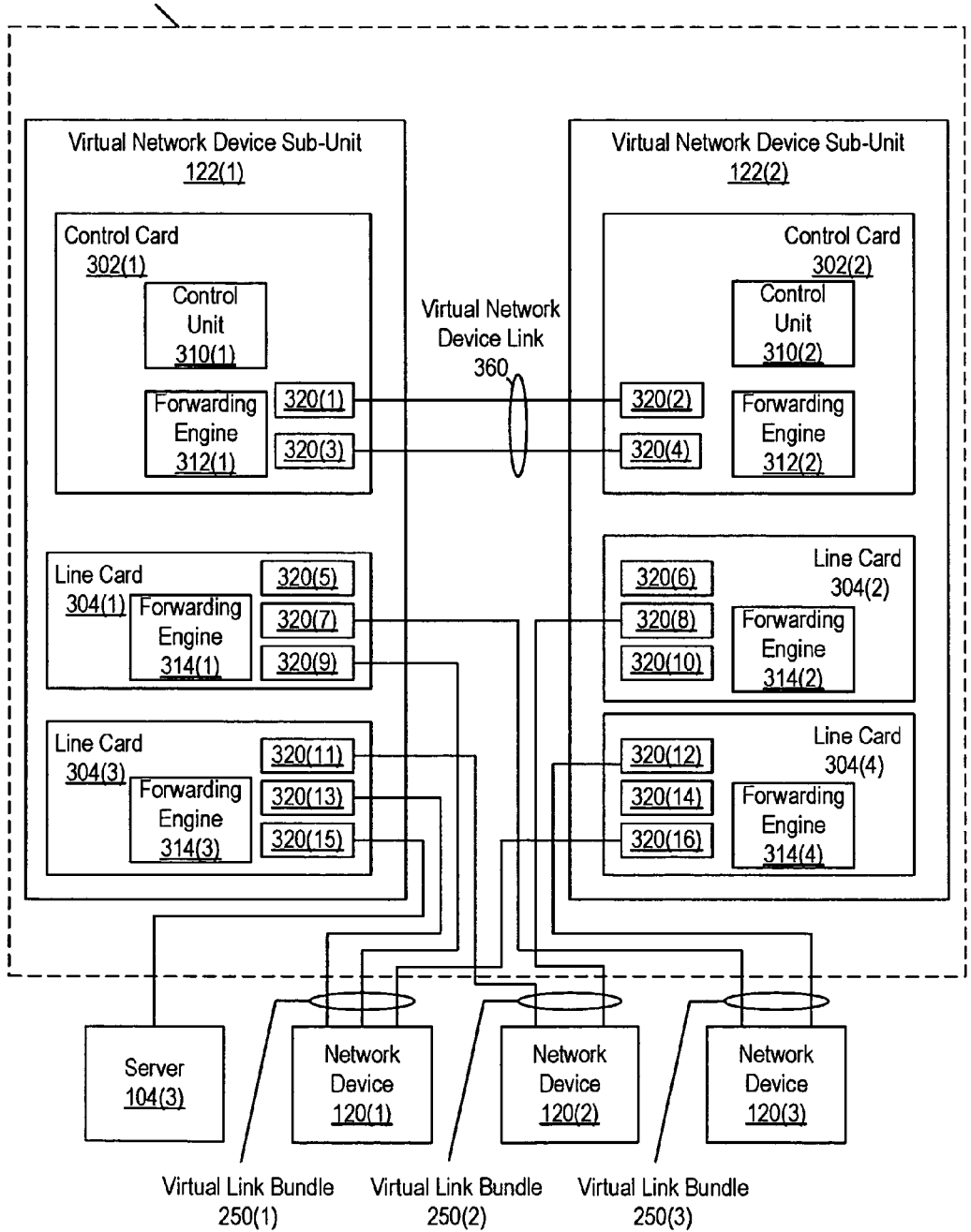
FIG. 3 shows more detail within each virtual network device sub-unit included in a virtual network device, according to one embodiment of the present invention.

Within each network layer, multiple redundant network devices are configured to collectively operate as a single virtual network device. For example, as shown in FIG. 1, two or more network devices in distribution layer 112 operate as a virtual network device 202. Similarly, two or more of network devices 124(1)-124(n) operate as a single virtual network device 204, and two or more of network devices 126(1)-126(n) operate as a single virtual network device 206. More details of how two distribution-layer network devices can collectively operate as a distribution-layer virtual network device 202 are shown in FIGS. 2A, 2B, and 3. Virtual network devices can be coupled to other virtual network devices, to network devices, and/or to clients and/or servers by virtual link bundles, as described below. In general, any multi-ported device (whether a physical device, such as a network device, client, or server, or a virtual network device) can be coupled to a virtual network device by a virtual link bundle that includes several links, some of which terminate on different sub-units within the virtual network device.

FIG. 2A shows an example of a network in which there are two network devices 120(1) and 120(2) in access layer 110. There are also two network devices 122(1) and 122(2) in distribution layer 112. These two network devices 122(1) and 122(2) operate as a single virtual network device 202 in this example. Each network device 120(1)-120(2) is coupled to distribution layer 112 by two links. In this example, each of those two links is coupled to a different one of network devices 122(1) and 122(2). This provides redundancy, allowing network devices 120(1) and 120(2) to continue to communicate with distribution layer 112 even if one of network devices 122(1) or 122(2) fails or if one of the links between a given access-layer network device and a given distribution-layer network device fails.

The redundant links coupling each of network devices 120(1) and 120(2) to virtual network device 202 can be operated as a single logical link, referred to herein as a virtual link bundle. Network device 120(1) operates the two links coupling network device 120(1) to virtual network device 202 as a virtual link bundle 250(1). In such an embodiment, each interface in network device 120(1) that is coupled to one of the links is included in an interface bundle, which corresponds to virtual link bundle 250(1). Network device 120(2) similarly operates the two links coupling network device 120(2) to virtual network device 202 as virtual link bundle 250(2). In some embodiments, virtual link bundles 250(1) and 250(2) are each operated as an EtherChannel (TM) or as an aggregated link (as described in IEEE 802.3). In other embodiments, each link in each virtual link bundle is operated independently of each other link in that virtual link bundle (as opposed to being operated as part of a single logical link).

As shown in FIG. 2A, each virtual link bundle 250(1) and 250(2) includes links that terminate at different network devices in distribution layer 112. For example, virtual link bundle 250(1) couples network device 120(1) to both network device 122(1) and network device 122(2). This differs from conventional implementations in which logical links are only allowed between a single pair of network devices.

In some embodiments, network devices 120(1) and 120(2) are aware (e.g., through various state information maintained within each network device) that each virtual link bundle 250(1) and 250(2) includes links that are terminated on different network devices in distribution layer 112. In such an embodiment, network devices 120(1) and 120(2) may select a link within a particular virtual link bundle on which to send a packet based on this awareness.

In other embodiments, network devices 122(1) and 122(2) operate to conceal the fact that such a single logical link actually includes links that are terminated at different network devices. For example, as shown in FIG. 2A, network devices 122(1) and 122(2) operate as a single virtual network device 202. FIG. 2B illustrates how, from the perspective of network device 120(1) in access layer 110, network device 120(1) is coupled to a single network device, virtual network device 202, in distribution layer 112 by a redundant pair of links. Network device 120(2) has a similar perspective of virtual network device 202.

In embodiments, such as the one shown in FIG. 2B, in which network devices 120(1) and 120(2) see themselves as being connected to a single network device, the use of a virtual link bundle is simplified. For example, if network device 120(1) is aware that virtual link bundle 250(1) terminates at two different network devices, network device 120(1) can select a link on which to send a particular packet based on Spanning Tree Protocol. The use of Spanning Tree Protocol may involve more overhead and/or be more restrictive with respect to which links are used to send a given packet (e.g., Spanning Tree Protocol might block all but one of the links, preventing utilization of all but one non-blocked link) than if network device 120(1) simply views virtual network device 202 as a single entity. When viewing virtual network device 202 as a single entity, for example, network device 120(1) can simply select a link on which to send a packet based on load-sharing constraints. Similarly, if a link within virtual link bundle 250(1) fails, there is no need for network device 120(1) to change how Spanning Tree Protocol is applied. Instead, network device 120(1) simply continues to use the non-failed links within virtual link bundle 250(1).

The individual network devices, such as network device 122(1) and 122(2), included in virtual network device 202 are each referred to herein as a "virtual network device sub-unit". In some embodiments, virtual network device sub-units 122(1) and 122(2) are each implemented in a separate chassis (i.e., each chassis houses a single virtual network device sub-unit). For example, in FIG. 2A, network devices 122(1) and 122(2) can each have its own chassis. Even if virtual network device sub-units 122(1) and 122(2) share a chassis, each virtual network device sub-unit can be made to operate as an independent network device, allowing one virtual network device sub-unit to continue operating if the other virtual network device sub-unit(s) in the virtual network device fail.

For example, in one embodiment, virtual network device sub-unit 122(1) and virtual network device sub-unit 122(2) share the same chassis, but each virtual network device sub-unit has independent hardware, ports, uplink interfaces, and power supplies, and each virtual network device sub-unit can be removed from the chassis independently of the other. If virtual network device sub-unit 122(1) fails (e.g., due to a power supply failure or a software error), virtual network device sub-unit 122(2) can continue to run. In such an embodiment, virtual network device sub-unit 122(1) can be removed for repair or replacement without disrupting the operation of virtual network device sub-unit 122(2).

In some embodiments, the links in a virtual link bundle coupling a network device to an adjunct network device are specialized links, referred to herein as uplinks, that are used to couple an adjunct network device to a virtual network device. Each uplink can convey both a packet and additional information generated within one of the network devices. For example, if a packet is being conveyed on an uplink from an access-layer adjunct network device to a distribution-layer network device, additional information conveyed on the uplink with the packet includes information identifying which of the adjunct network device's ports received the packet. The additional information can also include information indicating whether any forwarding or routing has already been performed on the packet by the sending device. In some embodiments, use of uplinks allows a virtual network device to control adjunct network devices that are coupled to that virtual network device. The use of uplinks also facilitates the virtual network device being able to perform routing and/or forwarding for subordinate adjunct network devices. An interface within a network device or adjunct network device that is coupled to an uplink is referred to herein as an uplink interface.

FIG. 3 shows more detail within each network device included in a virtual network device. Here, virtual network device 202 includes two virtual network device sub-units 122(1) and 122(2). It is noted that in other embodiments, virtual network device 202 can include more than two component network devices. In this example, virtual network device 202 is located at the distribution layer of the network. However, similar virtual network devices can be implemented in other network layers (e.g., within the data center and/or core layer).

Virtual network device 202 is coupled to several access-layer network devices 120(1)-120(3). Network devices 120(2) and 120(3) are each coupled to virtual network device 202 by two uplinks, one to each virtual network device sub-unit 122(1) and 122(2). Network device 120(2) is coupled to virtual network device by virtual link bundle 250(2), and network device 120(3) is coupled to virtual network device 202 by virtual link bundle 250(3). As a result, network devices 120(2) and 120(3) can continue to communicate with the distribution layer even if one of these uplinks and/or one of virtual network device sub-units 122(1) and 122(2) fail. Network device 120(1) is coupled to virtual network device 202 by three uplinks: two uplinks to virtual network device sub-unit 122(1) and one uplink to virtual network device sub-unit 122(2). These three uplinks collectively form virtual link bundle 250(1). Network device 120(1) can continue to communicate with the distribution layer even if two of the three uplinks and/or one of virtual network device sub-units 122(1) and 122(2) fail. Network devices 120(1)-120(3) each operate their multiple uplinks to virtual network device 202 as a single logical uplink. Additionally, in some embodiments, each network device 120(1)-120(3) operates as if that network device is coupled to a single distribution-layer device, virtual network device 202, instead of operating as if that network device were coupled to two independent distribution-layer network devices.

Distribution-layer virtual network device sub-unit 122(1) is also coupled to a server 104(3) by a single link. Unlike access-layer network devices 120(1)-120(3), server 104(3) does not view distribution-layer network devices units 122(1) and 122(2) as a single logical network device. In this example, server 104(3) will be unable to communicate via the distribution layer if either network device 122(1) or the link coupling server 104(3) to network device 122(1) fails. It is noted that in alternative embodiments, a server such as server 104(3) but having multiple ports could be coupled to each virtual network device sub-unit by a virtual link bundle, and that such a server could interact with virtual network device sub-units 122(1) and 122(2) as if those sub-units were a single virtual network device 202.

Virtual network device sub-unit 122(1) includes several cards, including control card 302(1) and line cards 304(1) and 304(3). Similarly, virtual network device sub-unit 122(2) includes control card 302(2) and line cards 304(2) and 304(4). Control card 302(1) includes control unit 310(1), forwarding engine 312(1), and interfaces 320(1) and 320(3). Control card 302(2) likewise includes control unit 310(2), forwarding engine 312(2), and interfaces 320(2) and 320(4).

In virtual network device sub-unit 122(1), line card 304(1) includes forwarding engine 314(1) and interfaces 320(5), 320(7), and 320(9). Interface 320(7) is coupled to network device 120(3). Interface 320(9) is also coupled to network device 120(1). Interface 320(5) is unused in this example. Line card 304(3) includes forwarding engine 314(3), interfaces 320(11) and 320(13), and port 320(15). Interfaces 320(11) and 320(13) are respectively coupled to network devices 120(2) and 120(1). Interface 320(15) is coupled to server 104(3). In embodiments in which network devices 120(1)-120(3) are adjunct network devices controlled by virtual network device 202, interfaces 320(7), 320(9), 320(11), and 320(13) are operated as uplink interfaces, while interface 320(15), which is not coupled to an adjunct network device, is operated as a normal port.

In virtual network device sub-unit 122(2), line card 304(2) includes forwarding engine 314(2) and interfaces 320(6), 320(8), and 320(10). Interface 320(8) is coupled to adjunct network device 120(2), and interfaces 320(6) and 320(10) are unconnected. Line card 304(4) includes forwarding engine 314(4) and interfaces 320(12), 320(14), and 320(16). Interfaces 320(12) and 320(16) are respectively coupled to adjunct network devices 120(3) and 120(1). Interface 320(14) is unused. In embodiments in which network devices 120(1)-120(3) are adjunct network devices controlled by virtual network device 202, interfaces 320(8), 320(12), and 320(16) are operated as uplink interfaces, Note that while the interfaces in FIG. 2 have been described as both ingress and egress interfaces, interfaces that act as ingress-only or egress-only interfaces can also be used. For example, the functionality of each of the interfaces shown in FIG. 2 can be implemented using one ingress-only interface and one egress-only interface. Similarly, virtual link bundles 250(1)-250(3) can each include several links that only convey packets from a respective network device 120(1)-120(3) to virtual network device 202 and several links that only convey packets from virtual network device 202 to a respective network device 120(1)-120(3).

In the illustrated embodiment, control card 302(1) in virtual network device sub-unit 122(1) is coupled to control card 302(2) in virtual network device sub-unit 122(2) via a virtual network device link 360. In this example, virtual network device link 360 includes two links (two links are used to provide increased fault-tolerance and/or bandwidth; however, one link can be used in other embodiments). These links are a type of uplink in this example, carrying information (e.g., such as headers similar to those sent between line cards) in addition to packets. The uplinks in virtual network device link 360 are used to exchange information, which controls the operation of virtual network device 202, as well as packets between virtual network device sub-units 122(1) and 122(2). By communicating via these uplinks, virtual network device sub-units 122(1) and 122(2) coordinate their behavior such that virtual network device sub-units 122(1) and 122(2) appear to be a single virtual network device to network devices 120(1)-120(3).

Thus, providing interconnections between virtual network device sub-units 122(1) and 122(2) allows virtual network device sub-units 122(1) and 122(2) to operate as a single virtual network device 202. Network devices 120(1)-120(3) communicate with virtual network device 202 in the same way that network devices 120(1)-120(3) would communicate with a single physical device. For example, if network device 120(2) is handling a packet addressed to server 104(3), network device 120(2) selects one of the two uplinks in network device bundle 250(2) on which to send the packet. This selection is based on load-sharing criteria. In such a situation, since virtual network device 202 appears to be a single network device, network device 120(2) is just as likely to select the uplink to virtual network device sub-unit 122(2) as the uplink to virtual network device sub-unit 122(1), despite the fact that only virtual network device sub-unit 122(1) has a direct connection to server 104(3). If the packet is sent to virtual network device sub-unit 122(2), network device 122(2) then uses one of the uplinks included in virtual network device link 360 between virtual network device sub-units 122(1) and 122(2) to send the packet to virtual network device sub-unit 122(1), and virtual network device sub-unit 122(1) in turn provides the packet to its destination, server 104(3).

In other embodiments, network devices 120(1)-120(3) may be aware that their virtual link bundles 250(1) and 250(2) actually terminate on two different network devices. Network devices 120(1)-120(3) control packet transmission based on this information. For example, in this situation, network device 120(2) may handle a packet addressed to server 104(3) by selecting the uplink coupled to virtual network device sub-unit 122(1) instead of the uplink coupled to virtual network device sub-unit 122(2), based on the fact that network device 120(2) recognizes separate connections to two different network devices within the logical link.

Interfaces 320(13), 320(9), and 320(16), which are each coupled to network device 120(1) by virtual link bundle 250(1), form an interface bundle. As shown by virtual link bundle 250(1), a virtual link bundle can include more than two links. Additionally, a virtual link bundle can include links that terminate on different line cards within the same virtual network device sub-unit. Similarly, interfaces 320(11) and 320(8) form another interface bundle that is coupled to network device 120(2) by virtual link bundle 250(2). Interfaces 320(7) and 320(12) form a third interface bundle that is coupled to network device 120(3) by virtual link bundle 250(3). Within virtual network device 202, each interface in the same interface bundle is assigned the same logical identifier. For example, interfaces 320(13), 320(9), and 320(16) are each assigned the same logical identifier. In some embodiments, packets received via one of these interfaces are tagged or otherwise associated with the logical identifier to indicate that those packets were received via the virtual link bundle coupling virtual network device 202 to network device 120(1). It is noted that similar interface bundles are implemented within each network device 120(1)-120(3), and that interfaces included in such bundles can also be assigned the same logical identifier by each network device (or by virtual network device 202, in embodiments in which virtual network device 202 controls the configuration of the network devices 120(1)-120(3)). For example, network device 120(1) assigns the same logical identifier to each of the interfaces coupled to virtual link bundle 250(1).

The association between a packet and a particular logical identifier is used by forwarding engines within virtual network device 202 to route and forward packets to and from network devices 120(1)-120(3). For example, when a packet from a sending device (e.g., a client coupled to network device 120(1)) is received via uplink interface 320(13), virtual network device sub-unit 122(1) can learn that the sending device's MAC (Media Access Control) address is "behind" uplink interface 320(13) by associating the MAC address with the logical identifier of uplink interface 320(13). Virtual network device sub-unit 122(1) informs each forwarding engine in virtual network device sub-unit 122(1) as well as each forwarding engine in virtual network device sub-unit 122(2) of this association. Based on the association, packets addressed to that MAC address will be sent from an uplink interface having the associated logical identifier. Since in this case, uplink interfaces 320(9) (in virtual network device sub-unit 122(1)) and 320(16) (in virtual network device sub-unit 122(2)) also have the same logical identifier as uplink interface 320(13), a packet addressed to that MAC address can be forwarded via any of uplink interfaces 320(9), 320(13), and 320(16).

The same logical identifiers are used to identify uplink interface bundles by each of virtual network device sub-units 122(1) and 122(2), and the virtual network device sub-units coordinate to assign the same logical identifier to each uplink interface within the same uplink interface bundle. When forwarding packets via an uplink interface bundle identified by a particular logical identifier, each virtual network device sub-unit 122(1) and 122(2) generates a hash value to select one of the uplink interfaces within that uplink interface bundle on which to send the packet. Each of the virtual network device sub-units uses these hash values to identify local uplink interfaces within that virtual network. Thus, each virtual network device sub-unit will only select an uplink interface that is local to that virtual network device sub-unit. For example, if virtual network device sub-unit 122(1) is forwarding a packet via the uplink interface bundle that includes interfaces 320(9), 320(13), and 320(16), the hash value generated by virtual network device sub-unit will identify one of its interfaces 320(9) or 320(13).

In the above example, by associating each hash value with local uplink interfaces in the uplink interface bundle, the usage of virtual switch link 360 is reduced. Essentially, virtual network device sub-unit 122(1) favors its local uplink interfaces within a particular uplink interface bundle over remote uplink interfaces, in the same uplink interface bundle, on virtual network device sub-unit 122(2). Likewise, virtual network device sub-unit 122(2) favors its local uplink interfaces within a particular uplink interface bundle over uplink interfaces included in virtual network device sub-unit 122(1). For example, if virtual network device sub-unit 122(2) needs to forward a packet via an uplink interface, virtual network device sub-unit 122(2) will send that packet via uplink interface 320(12) instead of forwarding that packet across virtual network device link 360 to be sent via uplink interface 320(7). By favoring local interfaces, the amount of traffic sent over virtual network device link 360 is reduced, since each virtual network device sub-unit 122(1) and 122(2) will forward locally-received packets (i.e., packets received via interfaces other than those coupled to virtual network device link 360) from a local interface. FIGS. 6A-6D, described below, show a more detailed example of how traffic across virtual network device link 360 can be reduced by favoring local interfaces within the first virtual network device sub-unit to handle a particular packet.

For a given virtual link bundle, that virtual link bundle can be managed (e.g., with respect to control protocols such as L2 protocols) in a central location. For example, in one embodiment, all of the control protocol processing for virtual link bundle 250(1) takes place in control unit 310(1) of virtual network device sub-unit 122(1). The results of this control protocol processing are then communicated to control unit 310(2) of virtual network device sub-unit 122(2) and/or to a controller in network device 120(1). Control unit 310(2) then uses (but does not modify) this information when controlling how packets sent from and received via uplink interface 320(16) (which is in the uplink interface bundle coupled to virtual link bundle 250(1)) are handled. For example, control unit 310(2) uses this information to set up or modify lookup tables on line cards 304(2) and/or 304(4). In this way, the actual control protocol processing is centralized in control unit 310(1), as opposed to being distributed among several control units in virtual network device 202.

The central point of control protocol processing can vary among virtual link bundles. For example, while control protocol processing for virtual link bundle 250(1) is managed by control unit 310(1), control protocol processing for virtual link bundle 250(2) can be managed by control unit 310(2). In other words, control unit 310(2) can perform all of the control processing for virtual link bundle 250(2), and the information generated by control unit 310(2) is then communicated to control unit 310(1) for use (but not modification) within virtual network device sub-unit 122(1).

In embodiments that implement a central point of management within virtual network device 202 for each virtual link bundle's control protocol processing, L2 protocols are run across the virtual link bundle and/or interface bundles are used as routed L3 interfaces (it is noted that protocols other than L2 and L3 protocols are used in other embodiments). These abilities would not be available if the virtual network device sub-units within virtual network device 202 each performed control protocol processing for their local interface bundles independently of each other. Additionally, in embodiments implementing a central point of control protocol processing, a user can modify the virtual link bundle's control protocol behavior by accessing a single virtual network device sub-unit. In the above example, when updating control protocol behavior of virtual link bundle 250(1), a user can simply access virtual network device sub-unit 122(1) (instead of accessing both virtual network device sub-units 122(1) and 122(2)). Virtual network device sub-unit 122(1) then automatically propagates to network device 122(2) any changes made by the user to the control protocols. Furthermore, since the use of virtual link bundles allows several uplinks to be managed as a single logical uplink, fewer uplink interfaces need to be configured than would be required if virtual link bundles were not used. For example, if each virtual link bundle includes two uplinks, the number of uplink interfaces within virtual network device 202 that need to be configured by a user is halved.

Virtual network device sub-units 122(1) and 122(2) implement certain behaviors in order to act as a virtual network device 202 that, from the perspective of network devices 120(1)-120(3), appears to be a single logical network device.

For example, whenever virtual network device sub-unit 122(2) receives a packet from a local network device, client, or server and that packet's destination logical identifier identifies an uplink interface bundle, virtual network device sub-unit 122(2) sends the packet from a local uplink interface within the identified uplink interface bundle. Virtual network device sub-unit 122(2) can also provide the packet to virtual network device sub-unit 122(1), but virtual network device sub-unit 122(1) should not output this packet on a virtual link bundle. This way, the destination device only receives one copy of the packet from virtual network device 202 (as opposed to receiving one copy from each virtual network device sub-unit 122(1) and 122(2)) and the appearance of virtual network device 202 being a single entity is maintained.

To operate in this way, each egress uplink interface coupled to a link in a virtual link bundle is configured to filter out traffic received via virtual network device link 360. For example, virtual network device sub-unit 122(1) receives a packet via virtual network device link 360. The interface 320(1) or 320(3) that receives the packet updates information (e.g., in a header) associated with the packet to indicate that the packet was received via virtual network device link 360 (in alternative embodiments, the sending interface in virtual network device sub-unit 122(2) updates this information). When virtual network device sub-unit 122(1) looks up the destination address of the packet in a lookup table, the lookup table returns the logical identifier that identifies local uplink interfaces 320(9) and 320(13). The packet is then forwarded to uplink interface 320(13) (e.g., selected based on load-sharing considerations). When uplink interface 320(13) receives the packet, uplink interface 320(13) will only output the packet if the packet was not received via virtual switch link 360, since if the packet was received via the virtual switch link, the other virtual network device sub-unit 122(2) will have already sent the packet via the virtual link bundle. Thus, uplink interface 320(13) filters the packet from the packet flow being sent via uplink interface 320(13) based on the information appended to the packet that indicates whether the packet was received via virtual network device link 360.

In some embodiments, MAC notification frames are used to keep the content of the L2 tables in virtual network device sub-unit 122(1) synchronized with the content of the L2 tables in virtual network device sub-unit 122(2) and vice versa. Whenever a MAC notification that involves a port behind a virtual link bundle or an uplink interface included in an uplink interface bundle is generated within a virtual network device sub-unit (e.g., such a notification is generated by one line card in order to update an L2 table on another line card), a copy of the MAC notification is sent via virtual network device link 360. Similarly, if a virtual network device sub-unit determines that a packet should be flooded, the virtual network device sub-unit will send a copy of that packet via virtual network device link 360, ensuring that the virtual network device sub-unit will receive a copy of any MAC notification response generated by a forwarding engine in the peer virtual network device sub-unit.

By way of example, assume that virtual network device sub-unit 122(1) floods a packet because the forwarding engine(s) included in virtual network device sub-unit 122(1) do not know which port or uplink interface is associated with the packet's destination address. As part of flooding the packet, virtual network device sub-unit 122(1) sends a copy of the packet to virtual network device sub-unit 122(2) via virtual switch link 360. If a forwarding engine within virtual network device sub-unit 122(2) already knows that the destination address is behind a particular uplink interface or port (e.g., if a forwarding table already includes an entry associating the destination address with a port of one of network devices 120), that forwarding engine generates a MAC notification identifying this association, which is distributed to any other forwarding engines within virtual network device sub-unit 122(2). Since the packet was originally received via virtual network device link 360, virtual network device sub-unit 122(2) also sends a copy of the MAC notification back via virtual network device link 360. This MAC notification is then distributed among the forwarding engines included in virtual network device sub-unit 122(1). After being updated based on the MAC notification, the forwarding engines in virtual network device sub-unit 122(1) now know the location of the device identified by the destination address. Accordingly, subsequently-received packets addressed to that device will not be flooded.

When all of the physical links in a virtual link bundle that connect to a single virtual network device sub-unit fail, the virtual link bundle transitions to a normal link bundle that is coupled to a single virtual network device sub-unit. At this point, the behavior of each virtual network device sub-unit with respect to that network device bundle is modified. For example, assume that all of the uplinks in virtual link bundle 250(1) that are coupled to virtual network device sub-unit 122(2) fail. At this point, virtual network device sub-unit 122(2) no longer has any local uplink interfaces that can send packets via virtual link bundle 250(1). Accordingly, virtual network device sub-unit 122(2) will redirect all traffic that needs to be sent via virtual link bundle 250(1) across virtual network device link 360. Additionally, since network device 122(2) can no longer send packets via virtual link bundle 250(1), virtual network device sub-unit 122(1) will cease to filter traffic received via virtual network device link 360 from being sent via virtual link bundle 250(1). If at least one of the uplinks in virtual link bundle 250(1) that is coupled to virtual network device sub-unit 122(2) is restored, virtual link bundle 250(1) will transition back to its normal mode of operation, in which virtual network device sub-unit 122(2) will send locally-received packets via virtual link bundle 250(1) and virtual network device sub-unit 122(1) will filter packets received via virtual network device link 360 from being sent virtual link bundle 250(1).

Distributed Forwarding within a Virtual Network Device

FIGS. 4A-4F illustrate how two virtual network device sub-units 122(1) and 122(2), which collectively operate as a single virtual network device, perform distributed forwarding for a packet having a multicast destination address. In this example, at most one copy of a packet having a multicast destination address is transferred between the virtual network device sub-units via virtual network device link (VNDL) 360.

In FIGS. 4A-4F, a virtual network device includes two virtual network device sub-units 122(1) and 122(2). Virtual network device sub-unit 122(1) includes two forwarding engines (FEs), FE 410(1) and FE 410(2). Virtual network device sub-unit 122(1) has one interface 420(1) to a device in Virtual Local Area Network (VLAN) Blue (in this example, different VLANs are referred to using different colors). Virtual network device sub-unit 122(1) also includes an interface coupled to virtual link bundle (VLB) 450(1) and another interface coupled to virtual link bundle 450(2). VLB 450(1) is coupled to a device in VLAN Blue, and VLB 450(2) is coupled to a device in VLAN Green. Virtual network device sub-unit 122(1) also includes an interface that is coupled to virtual network device link 360. It is noted that in other embodiments, a virtual network device includes more than two virtual network device sub-units.

Virtual network device sub-unit 122(2) includes two forwarding engines, FE 410(3) and FE 410(4). Virtual network device sub-unit 122(2) has one interface 420(2) to a device in Virtual Local Area Network (VLAN) Red. Virtual network device sub-unit 122(2) also includes an interface coupled to virtual link bundle (VLB) 450(1) and another interface coupled to virtual link bundle 450(2). Virtual network device sub-unit 122(2) also includes an interface that is coupled to virtual network device link 360.

In some embodiments, each virtual network device sub-unit 122(1) and 122(2) includes two or more forwarding engines. The number of forwarding engines in a virtual network device sub-unit can be proportional to the number of line cards included in that virtual network device sub-unit. For example, in one embodiment, each line card has its own forwarding engine. Each forwarding engine 410(1)-410(4) is an example of a distributed forwarding module that is configured to perform distributed forwarding for a packet having a multicast destination address.

Within a virtual network device in which each line card has its own forwarding engine, a packet is handled by up to two forwarding engines per virtual network device sub-unit. Within each virtual network device sub-unit, a given copy of a packet is forwarded by up to two forwarding engines. One of these forwarding engines is the forwarding engine on the ingress line card, which is the line card that includes the interface via which the packet is received into the virtual network device sub-unit. The other forwarding engine is on the egress line card, which is the line card that includes the interface via which a particular copy of the packet is output from the virtual network device sub-unit. If the ingress line card is also the egress line card for a given copy of the packet, that copy of the packet is only handled by one forwarding engine. It is noted that for a given packet, several copies of that packet can be output. For example, if a packet is flooded, the forwarding engine on the ingress line card causes a copy of that packet to be provided to each other line card.

In some embodiments, two different kinds of lookups are performed by each forwarding engine 410(1)-410(4). The first type of lookup is referred to herein as an ingress lookup. When an ingress lookup is performed for a packet, a "primary" entry can be allocated in a lookup table. The primary entry corresponds to the source address of the packet. If a lookup table on a particular line card includes a primary entry for a given address, the primary entry identifies an output interface on that particular line card via which a packet addressed to the given address should be output. Ingress lookups are typically performed for a packet by the first forwarding engine within the virtual network device to handle that packet. When an egress lookup is performed, primary entries cannot be allocated. Egress lookups are typically performed by forwarding engines other than the first forwarding engine to handle a given packet.

Figure 4A:
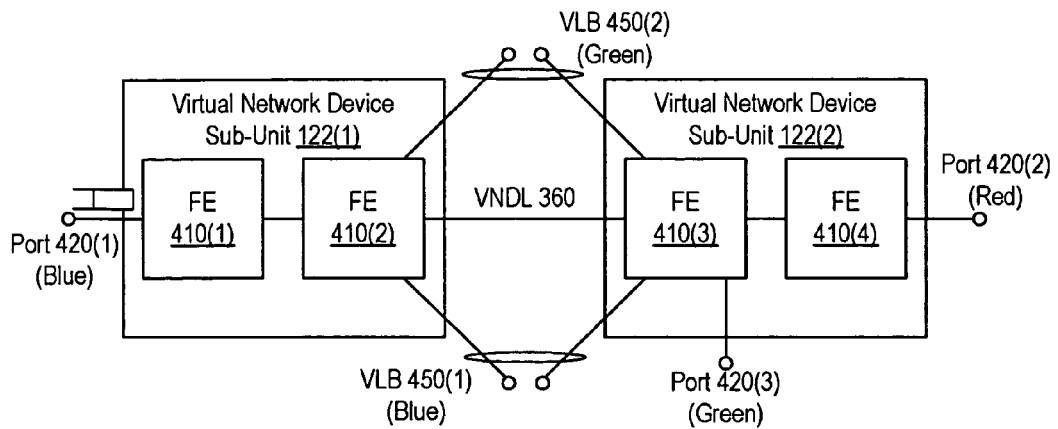
FIGS. 4A-4F illustrate the manner in which two virtual network device sub-units, which collectively operate as a single virtual network device, perform distributed forwarding for a packet having a multicast destination address, according to one embodiment of the present invention.

In FIG. 4A, a device coupled to port 420(1) sends a packet to the virtual network device. The packet has a multicast destination address. This packet is received by virtual network device sub-unit 122(1) via port 420(1). The packet is being conveyed in VLAN "Blue" (in this example, VLANs are identified using colors). In other words, VLAN Blue is the incoming VLAN for the packet.

Figure 4B:
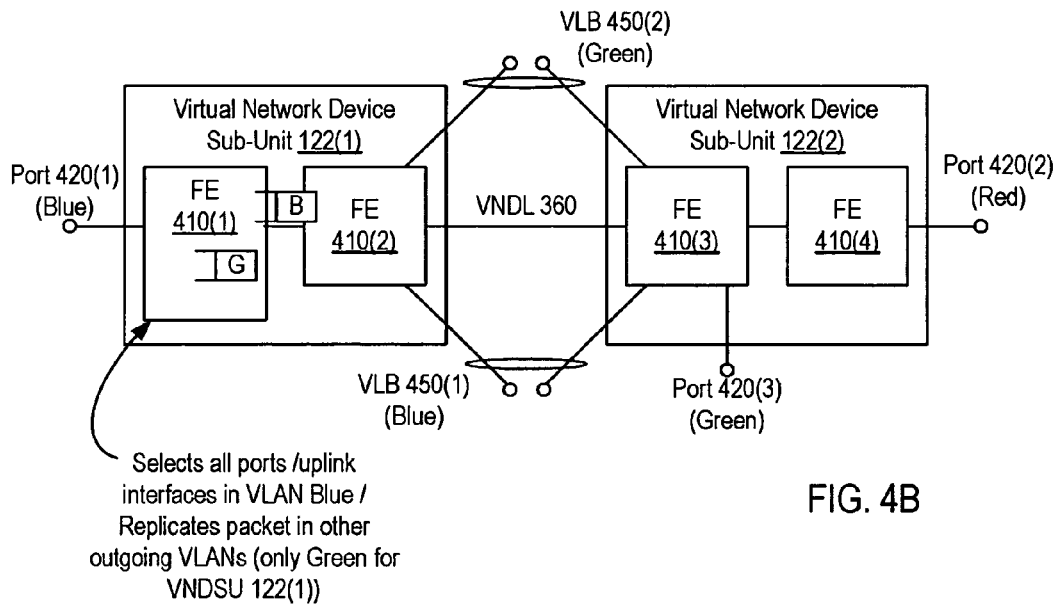

As shown in FIG. 4B, FE 410(1) performs lookups for packets received via port 420(1) (e.g., FE 410(1) can be included on the same line card as port 420(1), or port 420(1) can be included on a line card that does not include its own forwarding engine). In response to the packet being received via port 420(1), FE 410(1) performs an ingress lookup for the packet. In this example, for a packet with a multicast destination address, the ingress lookup includes both an L2 lookup and an L3 lookup (it is noted that other types of lookups can be used in other embodiments). The ingress lookup identifies outgoing interfaces associated with devices in the multicast group to which the packet is addressed.

The L2 lookup (which only identifies returns an index that identifies all interfaces within VLAN Blue. The identified interfaces are thus the local interface within the interface bundle coupled to virtual link bundle (VLB) 450(1) and port 420(1). Since the packet was received via port 420(1), the packet is not output via that port. FE 410(1) sends a copy of the packet (labeled "B") in VLAN Blue to FE 410(2), which performs forwarding for the local interface coupled to VLB 450(1) (e.g., FE 410(2) can be included on the same line card as the port coupled to VLB 450(1)). Information (e.g., in a header appended to the packet) associated with the copy of the packet sent to FE 410(2) indicates that an ingress lookup has already been performed.

The L3 lookup (which identifies outgoing interfaces in VLANs other than the incoming VLAN) identifies an outgoing interface, which is coupled to VLB 450(2), in VLAN Green. Since there is an outgoing interface in VLANs Red, FE 410(1) replicates the packet. By replicating the packet, FE 410(1) creates at least one copy of the packet for each outgoing VLAN. In this example, the packet is replicated in VLAN Green. FE 410(1) sends the replicated copy of the packet to FE 410(2) (e.g., because FE 410(2) is included on the same line card as the interface coupled to VLB 450(2)).

Figure 4C:
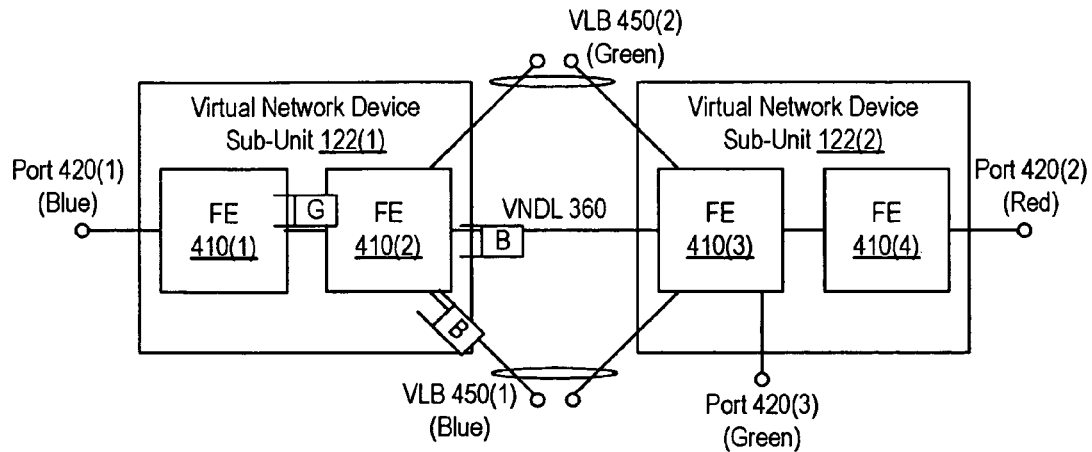

As shown in FIG. 4C, the replicated copy of the packet (labeled "G") in VLAN Green is received by FE 410(2). In response to receiving the copy of the packet in VLAN Blue, FE 410(2) performs an egress lookup for this copy of the packet. The egress lookup identifies outgoing interfaces within the incoming VLAN, VLAN Blue. In this example, the egress lookup identifies the interface coupled to VLB 450(1). Accordingly, FE 410(2) causes a copy of the packet to be output via VLB 450(1) in VLAN Blue. During the egress lookup, FE 410(2) also allocates a non-primary entry to the packet's source address, if no lookup table entry has already been allocated to that address. The non-primary entry indicates that packets having that address as a destination address should be forwarded to the line card that includes FE 410(1).

FE 410(1) also identifies that VLAN Blue was the incoming VLAN for the multicast packet. Accordingly, FE 410(1) sends a copy of the packet to virtual network device sub-unit 122(2) via virtual network device link (VNDL) 360. FE 410(1) also associates information with this copy of the packet (e.g., by appending a header to the packet) and sends the associated information to virtual network device sub-unit 122(2) via VNDL 360. The associated information identifies the incoming VLAN (VLAN Blue) in which the packet was originally received.

Figure 4D:
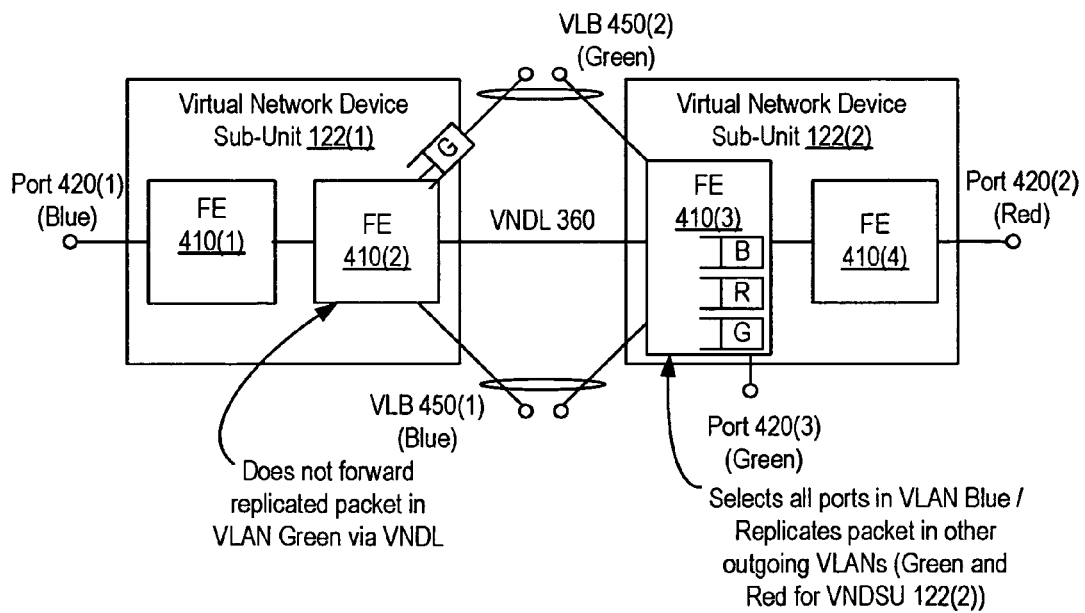

As shown in FIG. 4D, FE 410(2) also performs an egress lookup for the copy of the packet being conveyed in VLAN Green. The egress lookup identifies the local interface coupled to VLB 450(2) as the outgoing interface for this copy of the packet, and FE 410(2) causes the copy of the packet to be output via VLB 450(2).

Additionally, FE 410(3) in virtual network device sub-unit 122(2) performs an ingress lookup for the copy of the packet received via VNDL 360. Information associated with the packet identifies the incoming VLAN as VLAN Blue. The L2 lookup identifies the interface coupled to VLB 450(1). The L3 lookup identifies port 420(3) and the interface coupled to VLB 450(2) in VLAN Green and port 420(2) in VLAN Red. Accordingly, FE 410(3) causes the packet to be replicated in VLANs Green and Red.

Figure 4E:
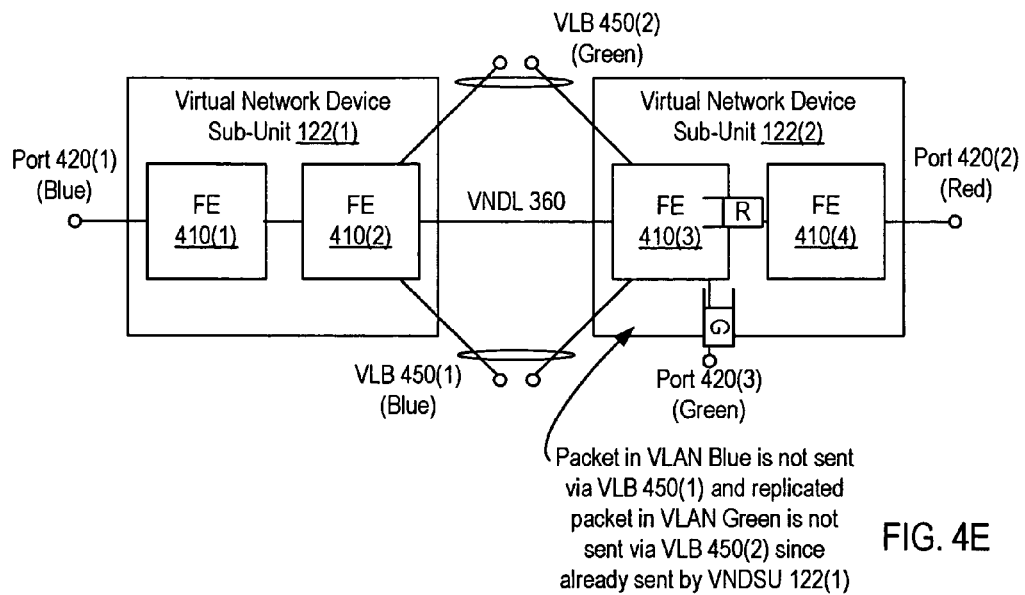

In FIG. 4E, the copy of the packet in VLAN Blue is not sent via VLB 450(1) by virtual network device sub-unit 122(2). For example, the interface coupled to VLB 450(1) filters the packet from the packet flow being output via VLB 450(1) in response to detecting that the packet has already been handled by virtual network device sub-unit 122(1). Similarly, the copy of the packet in VLAN Green is not sent via VLB 450(2). Accordingly, only one copy of the packet is output via each virtual link bundle.

FE 410(3) causes the copy of the packet in VLAN Green to be output via port 420(3). Since this port is not part of an interface bundle that spans both virtual network device sub-units 122(1) and 122(2), the packet is not filtered from the packet flow being output via port 420(3). FE 410(3) also causes the copy of the packet (labeled "R") in VLAN Red to be sent to FE 410(4) (e.g., because FE 410(4) and Port 420(2) are included on the same line card).

Figure 4F:
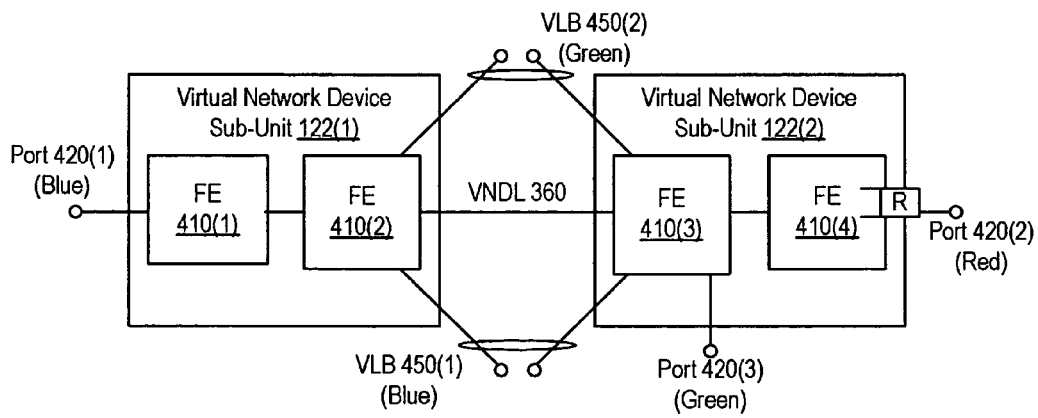

FIG. 4F shows how FE 410(4) performs an egress lookup for the copy of the packet being sent in VLAN Red. The egress lookup identifies port 420(2), and FE 410(4) causes the copy of the packet to be output via port 420(2). Since port 420(2) is not part of an interface bundle shared with virtual network device sub-unit 122(1), the packet is not filtered from the output flow being sent via port 420(2).

It is noted that in the above example, one forwarding engine in each virtual network device sub-unit performs an ingress lookup for the multicast packet. During the ingress lookup, the packet is replicated, if needed, in each outgoing VLAN. The forwarding engine that performs the ingress lookup forwards a copy of the packet to each line card that includes an interface in the incoming and/or outgoing VLANs. In the example of FIGS. 4A-4F, if a line card included interfaces in multiple VLANs (e.g., such as the line card that includes FE 410(2) and the interfaces coupled to VLB 450(1) and 450(2) respectively), that line card received one copy of the packet in each VLAN.

In alternative embodiments, at most one copy of the packet is sent to each line card, regardless of whether that line card includes outgoing interfaces in more than one of the incoming and/or outgoing VLANs. In such embodiments, a forwarding engine in each line card performs an ingress lookup for the packet in order to replicate the packet in other VLANs, if needed. For example, if this type of forwarding were used in the embodiment of FIG. 4A, only one copy of the multicast packet would be sent to FE 410(2). FE 410(2) would then perform an ingress lookup for the packet. As part of the ingress lookup, FE 410(2) would replicate the packet in VLAN Green.

Figure 5A:
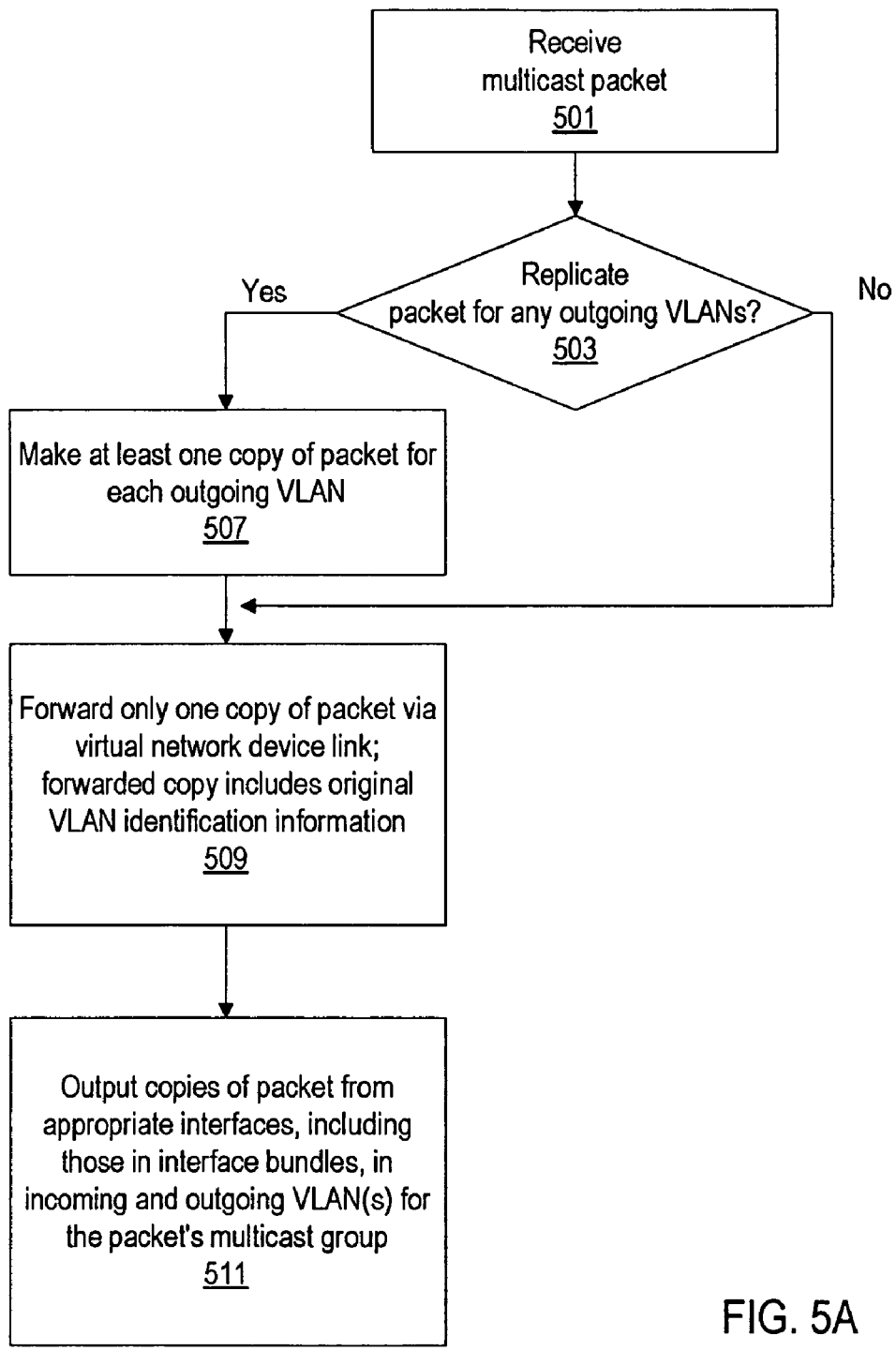
FIG. 5A is a flowchart of a method used by a virtual network device sub-unit to forward at most one copy of a multicast packet to each other virtual network device sub-unit in the same virtual network device, according to one embodiment of the present invention.

FIG. 5A is a flowchart of a method used by a virtual network device sub-unit to forward at most one copy of a multicast packet to another virtual network device sub-unit included in the same virtual network device. At 501, a multicast packet is received by a virtual network device sub-unit. The packet is received via an interface that is not coupled to a virtual network device link (i.e., the packet is received from a device other than another virtual network device sub-unit in the same virtual network device). The packet is being conveyed in a particular VLAN.

The virtual network device sub-unit performs an ingress lookup for the multicast packet. As part of this lookup, the virtual network device sub-unit determines whether the packet needs to replicated for other outgoing VLANs, as shown at 503. If the packet needs to be replicated because there are outgoing interfaces in VLANs other than the incoming VLAN, at least one copy of the packet is made for each outgoing VLAN, as shown at 507.

Regardless of whether the packet is replicated at 507, only one copy of the packet is sent to another virtual network device sub-unit via the virtual network device link, as shown at 509. Information associated with this packet (e.g., included in a header appended to the packet or included in an Ethernet tag within the packet), which is also sent via the virtual network device link, identifies the original incoming VLAN in which the packet was received.

At 507, the virtual network device sub-unit (which received the packet at 501) outputs one or more copies of the packet. These copies of the packet are output from appropriate ports and/or uplink interfaces, including those that are coupled to virtual link bundles, in the outgoing and incoming VLANs for the packet's multicast group.

Figure 5B:
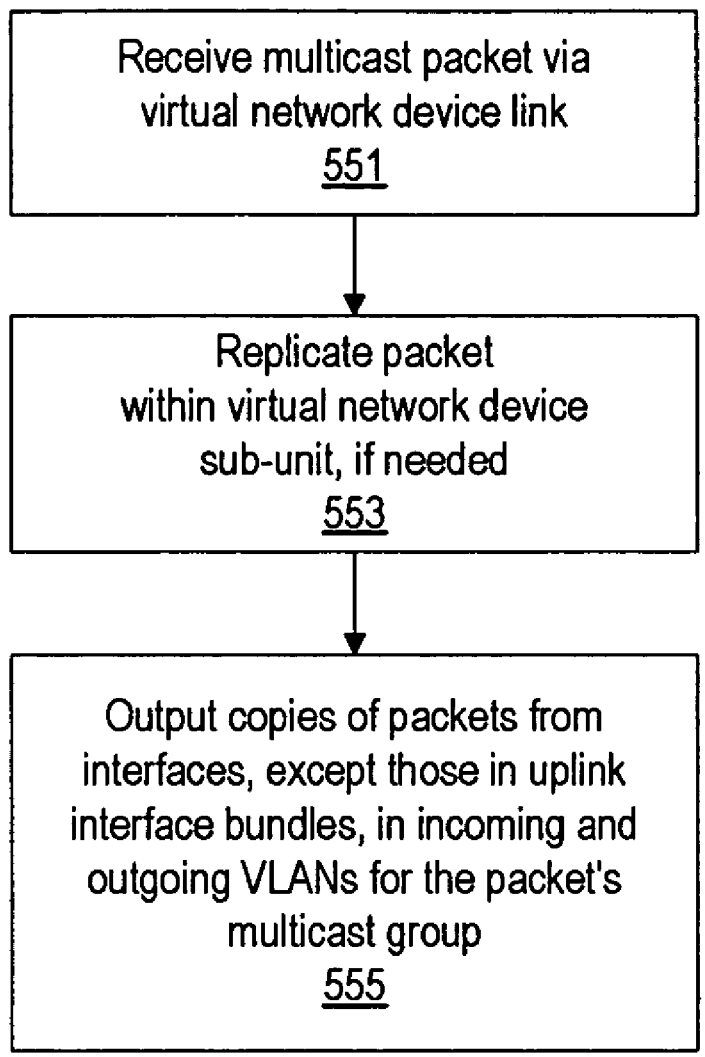
FIG. 5B is a flowchart of one embodiment of a method used by a virtual network device sub-unit to forward a multicast packet received from another virtual network device sub-unit in the same virtual network device.

FIG. 5B is a flowchart of a method used by a virtual network device sub-unit vice to forward a multicast packet received from another virtual network device sub-unit included in the same virtual network device. At 551, the virtual network device sub-unit receives a multicast packet via an interface coupled to a virtual network device link. In other words, the virtual network device sub-unit receives the multicast packet from another virtual network device sub-unit. Information identifying the incoming VLAN is also received.

At 553, the virtual network device sub-unit (which received the multicast packet at 551) replicates the packet, if needed. For example, the virtual network device sub-unit replicates the packet in one or more outgoing VLANs if the virtual network device sub-unit includes interfaces in those VLANs. In one embodiment, replication is performed as part of an ingress lookup for the multicast packet.

At 555, copies of the packet are output from interfaces in the incoming and outgoing VLANs. However, no copies of the packet are output from interfaces that are coupled to interface bundles.

FIGS. 6A-6K illustrate how two virtual network device sub-units, which collectively operate as a single virtual network device, perform distributed forwarding for a packet having a unicast destination address. It is noted that in other embodiments, a virtual network device can include more than two virtual network device sub-units. In FIGS. 6A-6K, two virtual network device sub-units 122(1) and 122(2) are coupled by virtual network device link (VNDL) 360. Virtual network device sub-unit 122(1) includes port 620(1), forwarding engines (FEs) 610(1) and 610(2), an interface coupled to virtual link bundle (VLB) 650(1), and an interface coupled to VNDL 360. Virtual network device sub-unit 122(2) includes port 620(2), forwarding engines (FEs) 610(3) and 610(4), an interface coupled to virtual link bundle (VLB) 650(1), and an interface coupled to VNDL 360. Each forwarding engine 610(1)-610(4) is an example of a distributed forwarding module that is configured to perform distributed forwarding for a packet having a unicast destination address.

Figure 6A:
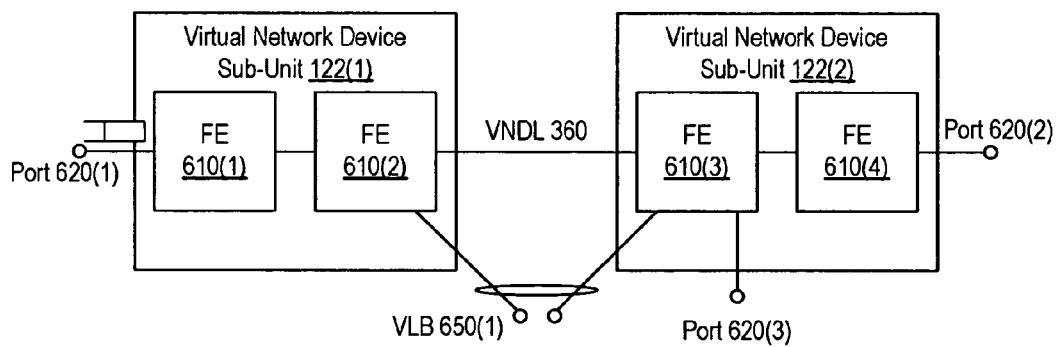
FIGS. 6A-6K illustrate how two virtual network device sub-units, which collectively operate as a single virtual network device, can perform distributed forwarding for a packet having a unicast destination address, according to one embodiment of the present invention.
Figure 6B:
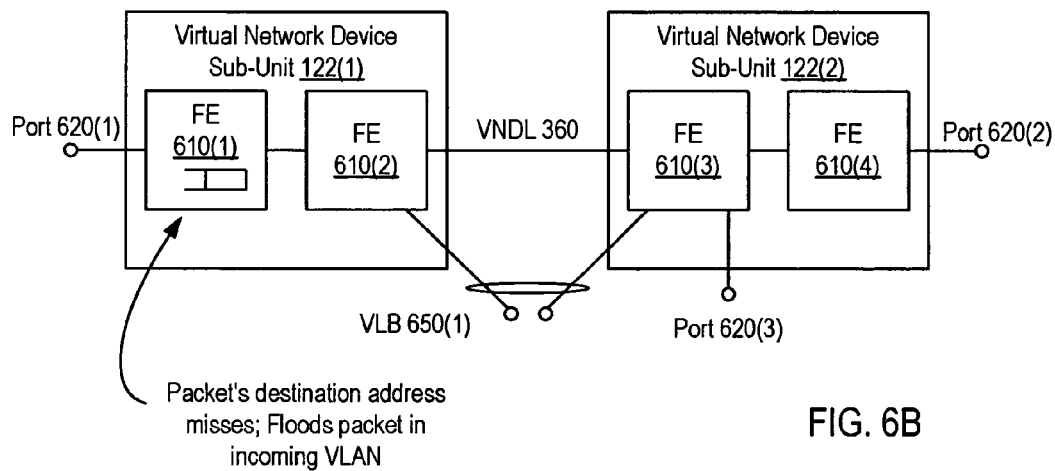

In FIG. 6A, virtual network device sub-unit 122(1) receives a packet via port 610(1). The packet is a unicast packet (i.e., the packet has a unicast destination address). As shown in FIG. 6B, FE 610(1) performs an ingress lookup for the unicast packet. The packet's destination address misses in the lookup table, and thus forwarding engine 610(1) floods the packet in the packet's incoming VLAN. If the lookup table does not already include an entry for the packet's source address, FE 610(1) allocates a primary entry to the packet's source address. The allocated primary entry indicates that the source address is associated with port 620(1). If FE 610(1) later forwards a packet having that address as its destination address, FE 610(1) will cause the packet to be output via port 620(1) in response to information stored in the primary entry.

Figure 6C:
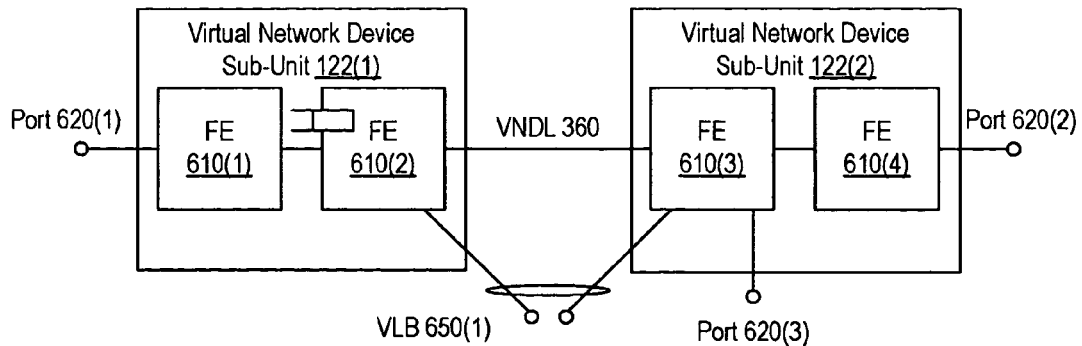

In FIG. 6C, FE 610(1) causes the packet to be forwarded to FE 610(2) (e.g., by forwarding the packet to the line card that includes FE 610(2)). FE 610(1) also sends information (e.g., included in a header appended to the packet) that indicates that an ingress lookup has already been performed for that packet and that the result of the ingress lookup was to flood the packet. For example, in some embodiments, FE 610(1) appends or otherwise associates a destination index, which in this situation is a flood index (e.g., a destination index that indicates that the packet is being flooded), with the packet.

Figure 6D:
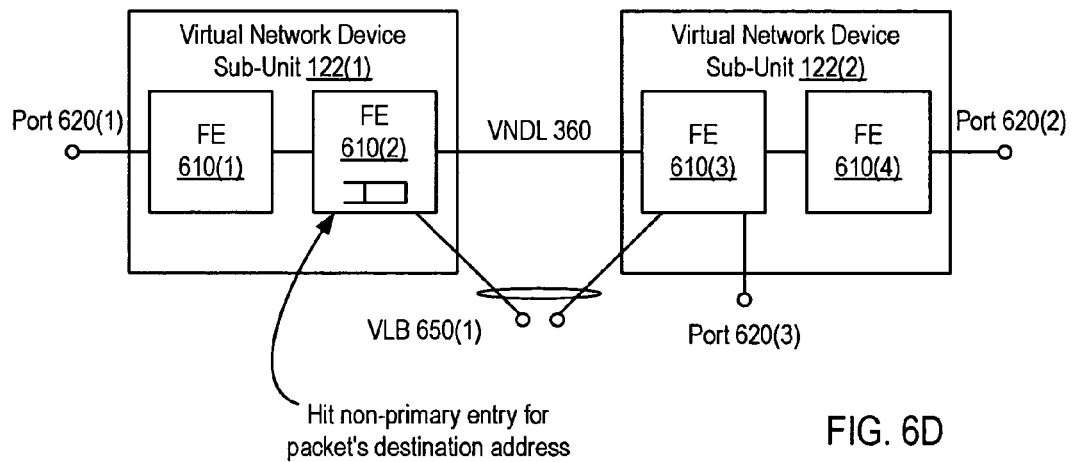

FE 610(2) performs an egress lookup for the packet in FIG. 6D. The egress lookup hits a non-primary entry for the packet's destination address. The non-primary entry identifies the outgoing interface (within the virtual network device) via which the packet should be output in order to reach its destination. In this example, the non-primary entry identifies that the packet should be output via VNDL 360 in order to reach its outgoing interface, port 620(2), which is included in virtual network device sub-unit 122(2). The fact that the entry is not a primary entry indicates that the outgoing interface (620(2) in this example) is not included on the same line card as (or a line card for which forwarding is performed by) FE 610(2). During the egress lookup, FE 610(2) also allocates a non-primary entry to the packet's source address (if an entry corresponding to that source address has not already been allocated). This non-primary entry indicates that packets having that address as a destination address should be forwarded to the line card that includes FE 610(1).

Figure 6E:
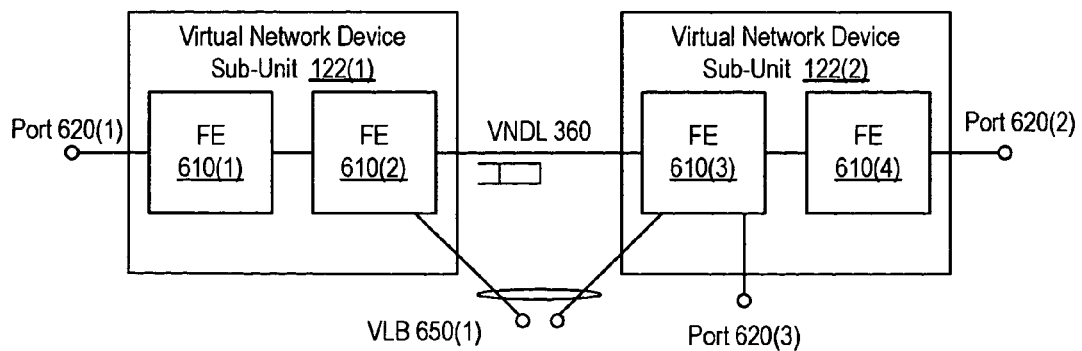

Since FE 610(2) found a matching entry for the packet's destination address, FE 610(2) does not continue to flood the packet. Accordingly, the packet is not sent via the local interface coupled to VLB 650(1). Since the matching entry was not a primary entry, however, FE 610(2) does not update the information associated with the packet. Instead, the information associated with the packet maintains the value generated by FE 610(1), which indicates that the lookup for the packet's destination address missed and that the packet is being flooded. FE 610(2) forwards the packet and the associated information to virtual network device sub-unit 122(2) via VNDL 360, as shown in FIG. 6E.

Figure 6F:
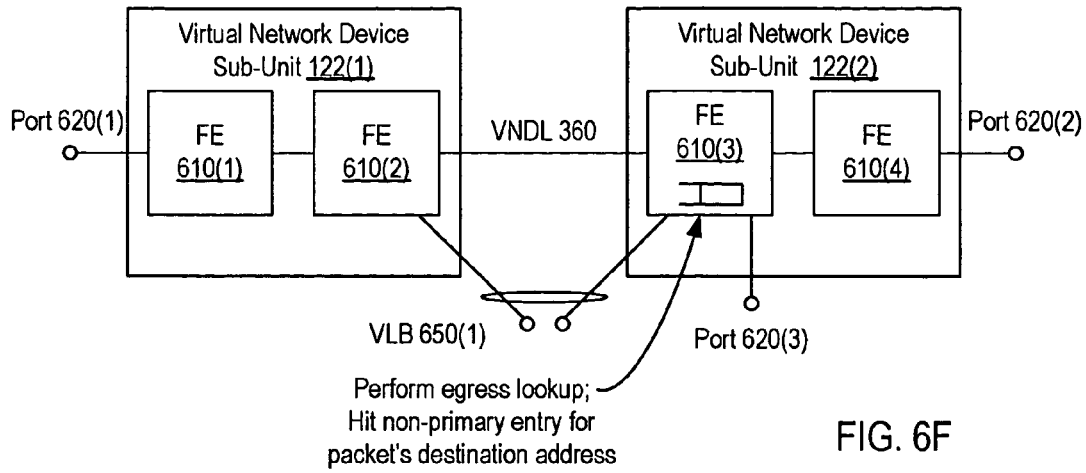

In FIG. 6F, FE 610(3) performs an egress lookup for the packet in response to receiving the packet via VNDL 360. Thus, despite being the first forwarding engine within virtual network device sub-unit 122(2) to perform a lookup for the packet, FE 610(3) performs an egress lookup (as opposed to an ingress lookup). This differs from the multicast forwarding scenario shown in FIGS. 4A-4F, where an ingress lookup is performed for a packet, received via the virtual network device link, with a multicast virtual address.

Figure 6G:
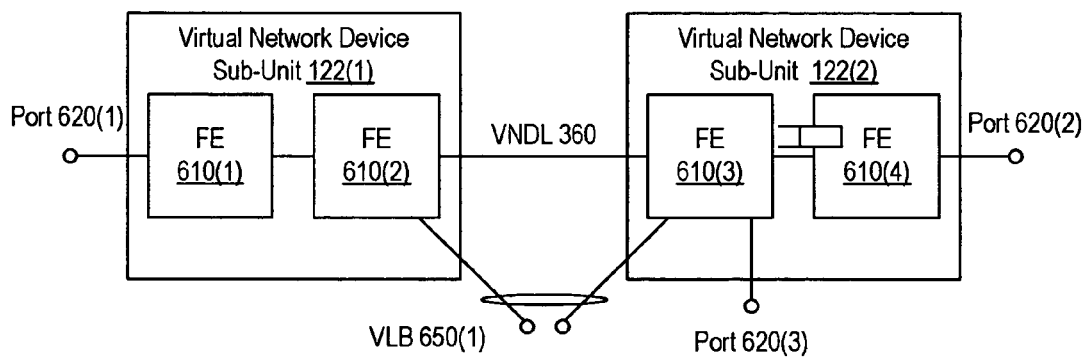

The egress lookup performed by FE 610(3) hits a non-primary entry for the packet's destination address. This non-primary entry can, for example, identify the line card that includes port 620(2). Since the matching entry is a non-primary entry, FE 610(3) does not modify the information associated with the packet. Instead, FE 610(3) causes the packet and the associated information (which still has the value generated by FE 610(1) in virtual network device sub-unit 122(1)) to be forwarded to FE 610(4), as shown in FIG. 6G.

During the egress lookup, FE 610(3) also allocates a non-primary entry to the packet's source address, if an entry corresponding to the source address has not already been allocated. In this example, the non-primary entry indicates that packets addressed to that address should be forwarded to virtual network device sub-unit 122(1) via VNDL 360. However, if the packet had been received by virtual network device sub-unit 122(1) via an interface bundle shared with virtual network device sub-unit 122(2), the non-primary entry allocated to the packet's source address could identify an interface in virtual network device sub-unit 122(2). For example, if the packet was received via VLB 650(1) and then forwarded to virtual network device sub-unit 122(2) via VNDL 360, FE 410(3) could allocate a non-primary entry to the packet's source address that identified the local interface coupled to VLB 650(1).

Figure 6H:
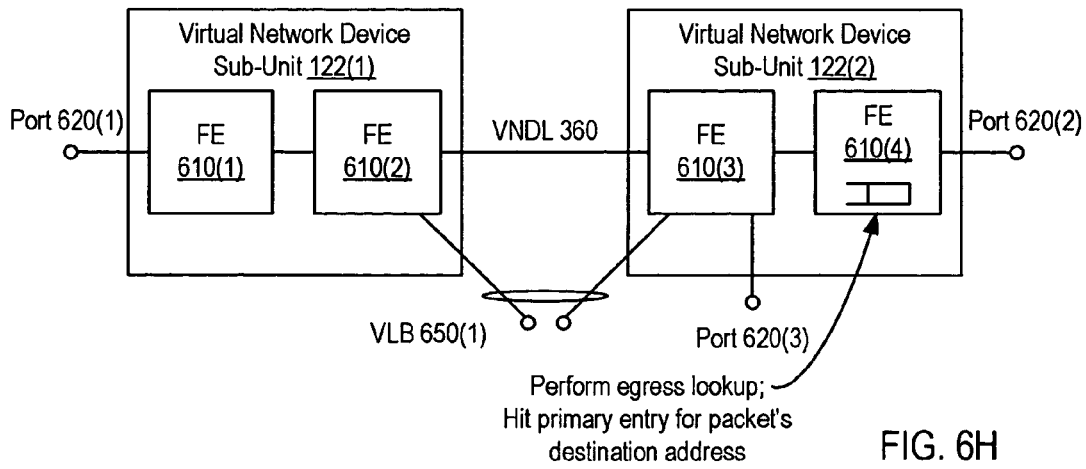

In FIG. 6H, FE 610(4) performs an egress lookup for the packet. The egress lookup hits a primary entry in the lookup table. The primary entry identifies port 620(2). For example, a destination index included in the primary entry identifies port 620(2).

FE 610(4) compares the information associated with the packet with the information in the primary entry. For example, FE 610(4) compares a destination index associated with the packet with the destination index included in the primary entry found during the egress lookup. Since the destination index associated with the packet by FE 610(1) is the flood index, and the destination index in the primary entry identifies port 620(2), the two destination indices will not match.

Figure 6I:
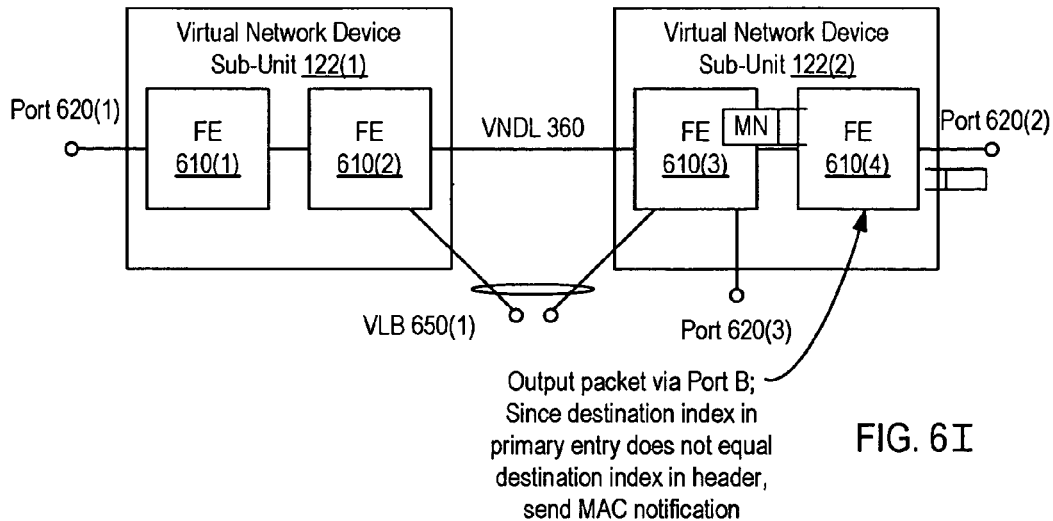

As shown in FIG. 6I, FE 610(4) causes the packet to be output via port 620(2). Additionally, since the information associated with the packet did not match the information found in the primary entry, FE 610(4) causes an error notification to be sent back towards the forwarding engine that performed the ingress lookup for the packet. In this example, the error notification is a MAC (Media Access Control) notification (labeled "MN"). The MAC notification indicates the packet's destination MAC address. FE 610(4) causes the MAC notification to be sent to FE 610(3).

Figure 6J:
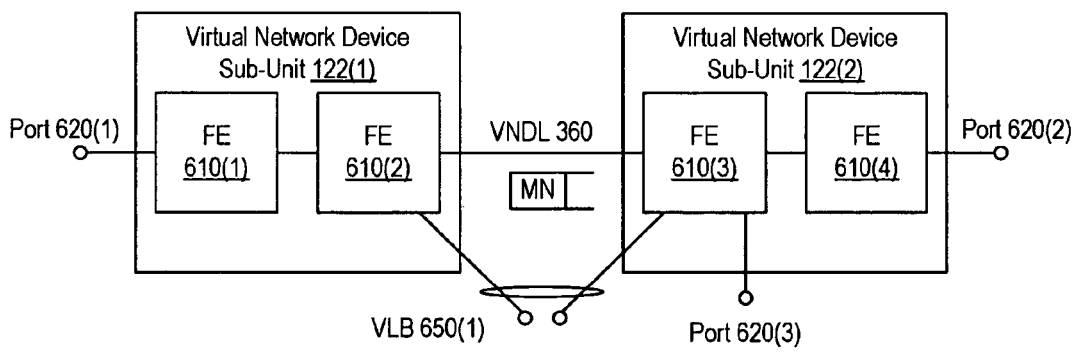
Figure 6K:
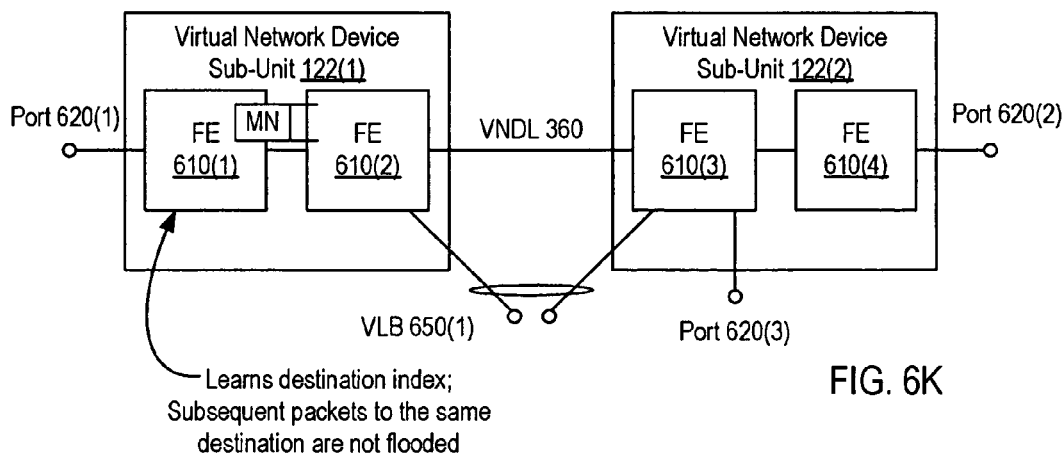

As shown in FIG. 6J, FE 610(3) forwards the MAC notification back to virtual network device sub-unit 122(1) via VNDL 360. Similarly, FE 610(2) forwards the MAC notification to FE 610(1), as shown in FIG>6K. In response to receiving the MAC notification, FE 610(1) "learns" the MAC address included in the packet by allocating a non-primary entry to the MAC address included in the packet. The non-primary entry includes a destination index or other information that identifies how FE 610(1) should forward a packet with that destination address. In this example, FE 610(1) includes a destination index identifying the line card that includes FE 610(2) in the non-primary entry allocated in response to the MAC notification, since FE 610(1) received the MAC notification from that line card. As a result of learning the MAC address, FE 610(1) will not flood subsequently received packets to that destination MAC address.

Figure 7:
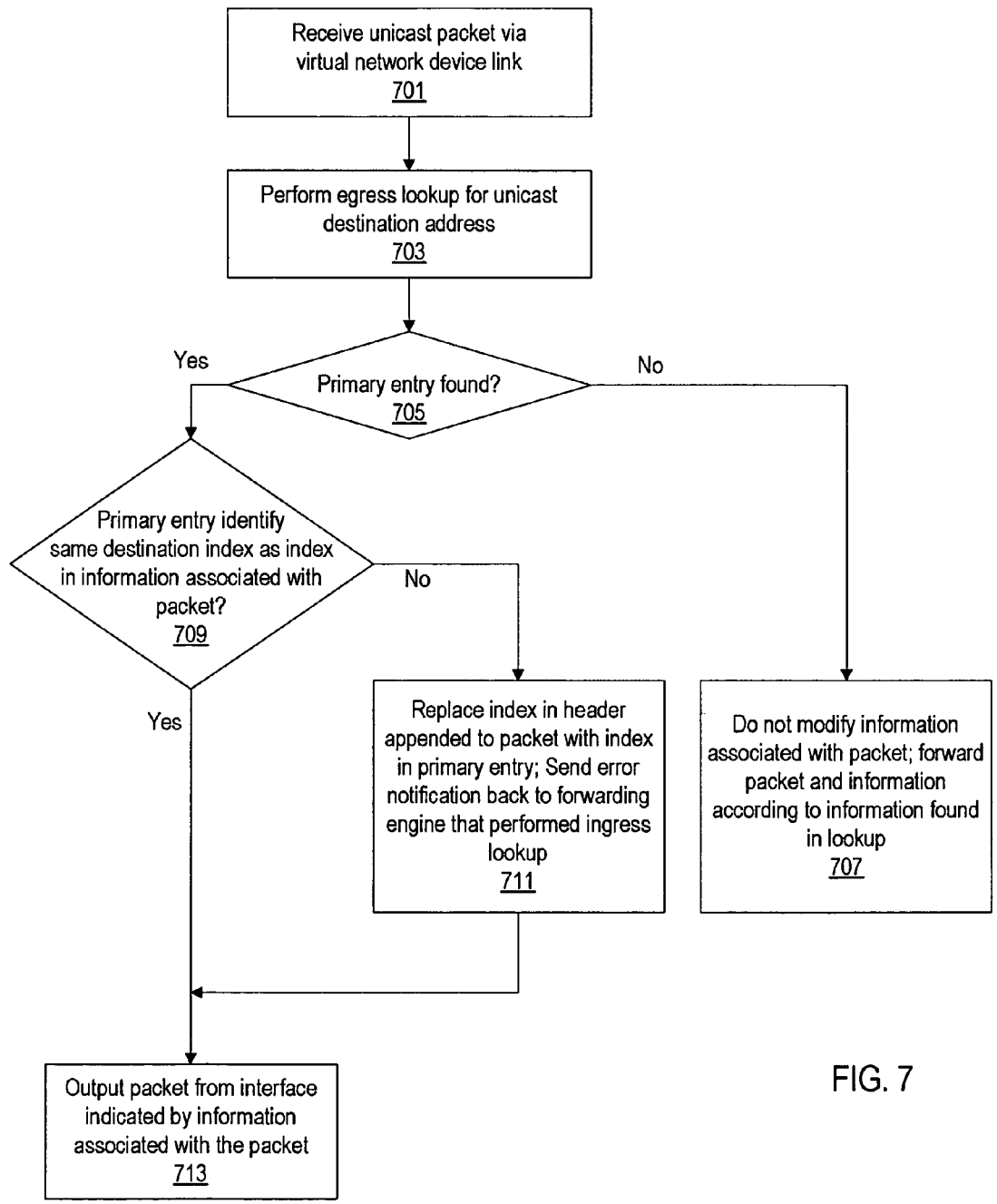
FIG. 7 is a flowchart of a method that a virtual network device sub-unit can use to forward a unicast packet received from another virtual network device sub-unit in the same virtual network device, according to one embodiment of the present invention.

FIG. 7 is a flowchart illustrating the manner in which a virtual network device sub-unit forwards a unicast packet received from another virtual network device sub-unit in the same virtual network device. At 701, the virtual network device sub-unit receives a unicast packet via a virtual network device link (i.e., the unicast packet is received from another virtual network device sub-unit). Information associated with the packet, such as a destination index, is also received via the virtual network device link. This associated information was generated by a forwarding engine (within the same virtual network device) that performed an ingress lookup for the packet.

At 703, an egress lookup is performed for the packet. An ingress lookup is not performed for the packet since a forwarding engine in the other virtual network device sub-unit will have already performed an ingress lookup for the packet. Performing the egress lookup can involve inputting all or part of the packet's destination address to a lookup table.

If a non-primary entry is found during the egress lookup, as determined at 705, the information associated with the packet is not modified. The packet and the associated information are forwarded according to the information found in the lookup, as shown at 707. For example, if the egress lookup does not find a matching entry, the packet and the associated information are flooded.

If a primary entry is found, as determined at 705, the information associated with the packet is compared to the information in the primary entry. For example, as shown at 709, a destination index included in the primary entry is compared to a destination index in the information that is associated with the packet. If the destination index in the primary entry does not match the destination index associated with the packet, the destination index associated with the packet is replaced with the destination index found in the primary entry, as shown at 711. Additionally, an error notification, such as a MAC notification, is sent back to the forwarding engine that performed the ingress lookup. After the destination index associated with the packet is replace, if needed, the packet is then forwarded according to the associated destination index, as shown at 713.

Figure 8:
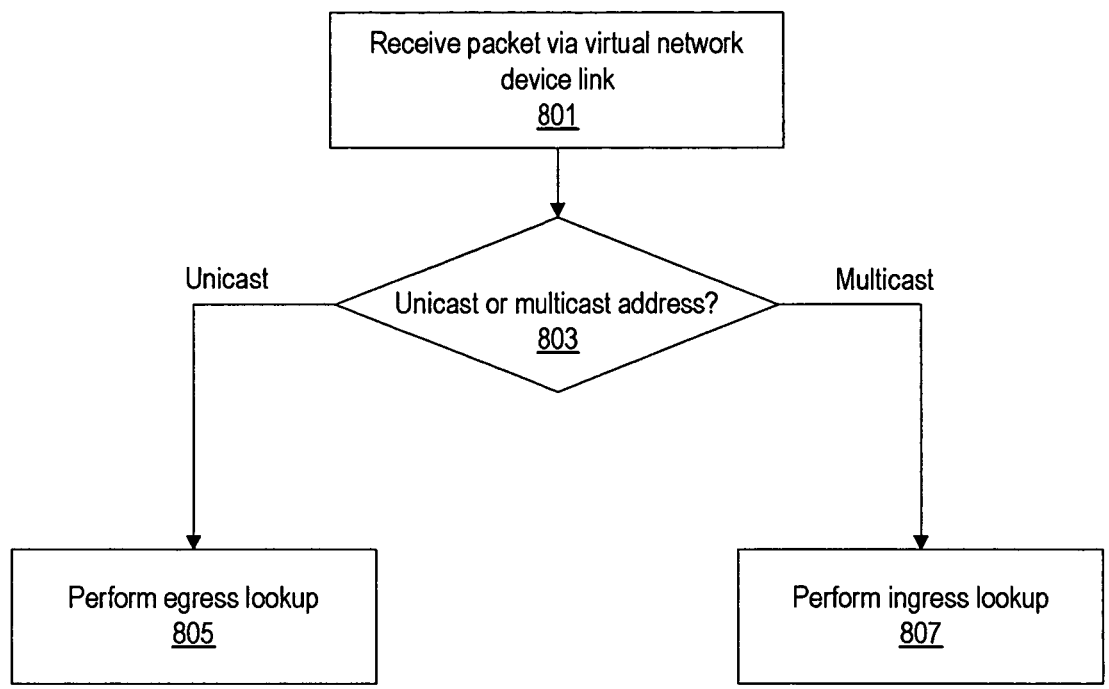
FIG. 8 is a flowchart of one embodiment of a method that a virtual network device sub-unit can use to forward packets received from another virtual network device sub-unit in the same virtual network device.

FIG. 8 is a flowchart illustrating the manner in which a virtual network device sub-unit forwards packets received from another virtual network device sub-unit in the same virtual network device. At 801, a packet is received via a virtual network device link. If the packet includes a unicast destination address, an egress lookup is performed for the packet's destination address, as shown at 803-805. If the packet includes a multicast destination address, an ingress lookup is performed for the packet's destination address, as shown at 803 and 805.

It is noted that in some embodiments, the functionality needed to perform distributed forwarding (e.g., by implementing a distributed forwarding module that performs one or more of the methods illustrated in FIGS. 5A, 5B, 7, and 8) is implemented in software executing on a virtual network device sub-unit. For example, each virtual network device sub-unit can include a computer readable media upon which program instructions and/or data useable to perform distributed forwarding are stored. Such program instructions are executable to detect the reception of packets, which are received by the adjunct network device via an interface. Exemplary types of computer readable media include CDs (Compact Discs), DVDs (Digital Versatile Discs), hard disks, optical disks, tape devices, floppy disks, and memory (e.g., various types of RAM (Random Access Memory), ROM (Read Only Memory), flash memory, MEMS (Micro Electro-Mechanical Systems) memory, and the like). Such a network device can include one or more processors (e.g., microprocessors, PLDs (Programmable Logic Devices), or ASICs (Application Specific Integrated Circuits)) configured to execute program instructions stored in the computer readable media. The program instructions and/or data can also be transferred to a virtual network device sub-unit via a network such as the Internet or upon a carrier medium. In some embodiments, a computer readable medium is a carrier medium such as a network and/or a wireless link upon which signals such as electrical, electromagnetic, or digital signals, on which the data and instructions are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method, comprising:
receiving a packet via a virtual network device link, the packet comprising a unicast destination address, wherein
the virtual network device link couples a first virtual network device sub-unit and a second virtual network device sub-unit, and wherein
the first virtual network device sub-unit and the second virtual network device sub-unit are configured to operate as a single virtual network device within a network, and
the virtual network device is configured to perform Layer 2 forwarding to forward the packet to one or more network devices within the network; and
performing an egress lookup for the packet in response to the receiving the packet, wherein
the performing the egress lookup in a lookup table on a first line card comprises allocating a non-primary entry corresponding to a source address of the packet in the lookup table, if an entry corresponding to the source address has not already been allocated, wherein the non-primary entry indicates a second line card.

2. The method of claim 1, wherein
a header associated with the packet is also received via the virtual network device link,
the header comprises a destination identifier.

3. The method of claim 2, further comprising:
sending the packet and the header to the second line card if the non-primary entry corresponding to the unicast destination address is found during the egress lookup.

4. The method of claim 2, further comprising:
if a primary entry corresponding to the unicast destination address is found during the egress lookup:
sending the packet from an interface on the first line card identified by the primary entry.

5. The method of claim 4, further comprising:
sending a notification via the virtual network device link if the destination identifier comprised in the header does not match a destination identifier comprised in the primary entry, wherein
the notification identifies the unicast destination address as corresponding to the destination identifier comprised in the primary entry.

6. The method of claim 4, wherein
the packet is only sent from the interface if the interface is not comprised in an uplink interface bundle.

7. The method of claim 1, further comprising:
receiving a second packet, the second packet comprising a multicast destination address; and
sending at most one copy of the second packet to one of the two virtual network device sub-units via the virtual network device link.

8. The method of claim 7, further comprising:
receiving a third packet via the virtual network device link, the third packet comprising a second multicast destination address; and
replicating the third packet for each of a plurality of outgoing VLANs (Virtual Local Area Networks) associated with the second multicast destination address.

9. The method of claim 8, further comprising:
sending at least one copy of the third packet to each line card that includes an interface associated with one of the outgoing VLANs.

10. The method of claim 8, further comprising:
sending at least one copy of the third packet to each line card that includes an interface associated with an incoming VLAN, wherein
the third packet is being conveyed in the incoming VLAN.

11. The method of claim 8, further comprising:
sending at most one copy of the third packet to each line card that includes an interface associated with one of the outgoing VLANs.

12. A method comprising:
receiving a packet via a virtual network device link; and
performing one of an ingress lookup and an egress lookup in a lookup table on a first line card for the packet, wherein
the ingress lookup is performed for the packet if the packet includes a multicast destination address,
the egress lookup is performed for the packet if the packet includes a unicast destination address, wherein
the performing the egress lookup comprises allocating a non-primary entry corresponding to a source address of the packet in the lookup table, if an entry corresponding to the source address has not already been allocated, wherein the non-primary entry indicates a second line card, and
a primary entry can be allocated in the lookup table in response to an ingress lookup but not in response to an egress lookup, wherein the primary entry indicates an interface on the first line card.

13. The method of claim 12, wherein
the packet includes a multicast destination address, and
the method further comprises:
replicating the packet for each of a plurality of outgoing VLANs associated with the multicast destination address.

14. The method of claim 13, further comprising:
sending at least one copy of the packet to each line card that includes an interface associated with one of the outgoing VLANs.

15. The method of claim 13, further comprising:
sending at most one copy of the packet to each line card that includes an interface associated with one of the outgoing VLANs.

16. The method of claim 13, further comprising:
not sending any copy of the packet via the virtual network device link.

17. The method of claim 13, further comprising:
not sending any copy of the packet via an uplink interface comprised in a uplink interface bundle.

18. The method of claim 12, wherein
a header associated with the packet is also received via the virtual network device link,
the header comprises a destination identifier, and
the packet comprises the unicast destination address, and
the method further comprises:
sending the packet and the header to the second line card if a non-primary entry corresponding to the unicast destination address is found during the egress lookup.

19. The method of claim 18, further comprising:
if a primary entry corresponding to the unicast destination address is found during the egress lookup:
sending the packet from an interface identified on the first line card by the primary entry corresponding to the unicast destination address.

20. The method of claim 19, further comprising:
sending a notification via the virtual network device link if a destination identifier comprised in the header does not match a destination identifier comprised in the primary entry corresponding to the unicast destination address, wherein
the notification identifies the unicast destination address as corresponding to the destination identifier comprised in the primary entry corresponding to the unicast destination address.

21. The method of claim 18, wherein
the packet is only sent from the interface if the interface is not comprised in a uplink interface bundle.

22. A system comprising:
an interface to a virtual network device link, wherein
the interface is configured to receive a packet,
the virtual network device link couples a first virtual network device sub-unit and a second virtual network device sub-unit,
the first virtual network device sub-unit and the second virtual network device sub-unit are configured to operate as a single virtual network device within a network, and
the virtual network device is configured to perform Layer 2 forwarding to forward the packet to one or more network devices within the network; and
a distributed forwarding module coupled to the interface, wherein
the distributed forwarding module is configured to perform one of an ingress lookup and an egress lookup in a lookup table on a first line card for the packet, wherein
the distributed forwarding module is configured to perform an ingress lookup for the packet if the packet includes a multicast destination address,
the distributed forwarding module is configured to perform an egress lookup for the packet if the packet includes a unicast destination address, wherein performing of the egress lookup comprises allocating a non-primary entry corresponding to a source address of the packet in the lookup table, if an entry corresponding to the source address has not already been allocated, wherein the non-primary entry indicates a second line card, and
a primary entry can be allocated in the lookup table in response to an ingress lookup but not in response to an egress lookup, wherein the primary entry indicates an interface on the first line card.

23. The system of claim 22, wherein
the packet includes a multicast destination address, and
the distributed forwarding module is configured to replicate the packet for each of a plurality of outgoing VLANs associated with the multicast destination address.

24. The system of claim 22, further comprising:
one or more line cards, wherein
the distributed forwarding module is configured to send at least one copy of the packet to each of the one or more line cards that includes an interface associated with one of the outgoing VLANs.

25. The system of claim 22, further comprising:
one or more line cards, wherein
the distributed forwarding module is configured to send at most one copy of the packet to each line card that includes an interface associated with one of the outgoing VLANs.

26. The system of claim 22, further comprising:
a second interface configured to receive a second packet, wherein
the second packet comprises a second multicast address, and
the distributed forwarding module is configured to send at most one copy of the second packet via the virtual network device link.

27. The system of claim 22, wherein
a header associated with the packet is also received via the virtual network device link,
the header comprises a destination identifier, and
the packet comprises the unicast destination address, and
the distributed forwarding module is configured to send the packet and the header to the second line card if a non-primary entry corresponding to the unicast destination address is found during the egress lookup.

28. The system of claim 27, further comprising:
a second interface on the first line card, wherein
the distributed forwarding module is configured to send the packet from the second interface if a primary entry corresponding to the unicast destination address is found during the egress lookup and if the primary entry corresponding to the unicast destination address identifies the second interface.

29. The system of claim 28, wherein
the distributed forwarding module is configured to send a notification via the virtual network device link if a destination identifier comprised in the header does not match a destination identifier comprised in the primary entry corresponding to the unicast destination address, and
the notification identifies the unicast destination address as corresponding to the destination identifier comprised in the primary entry corresponding to the unicast destination address.

30. A system comprising:
means for receiving a packet via a virtual network device link, the packet comprising a unicast destination address, wherein
the virtual network device link couples a first virtual network device sub-unit and a second virtual network device sub-unit, and wherein
the first virtual network device sub-unit and the second virtual network device sub-unit are configured to operate as a single virtual network device within a network, and
the virtual network device is configured to perform Layer 2 forwarding to forward the packet to one or more network devices within the network; and
means for performing an egress lookup for the packet in a lookup table on a first line card in response to receipt of the packet, wherein
the means for performing the egress lookup comprises means for allocating a non-primary entry corresponding to a source address of the packet in the lookup table, if an entry corresponding to the source address has not already been allocated, wherein the non-primary entry indicates a second line card.

31. The system of claim 30, wherein
a header associated with the packet is also received via the virtual network device link,
the header comprises a destination identifier obtained by performing an ingress lookup for the packet.

32. The system of claim 31, further comprising:
means for sending the packet and the header to the second line card if the non-primary entry corresponding to the unicast destination address is found during the egress lookup.

33. The system of claim 31, further comprising:
means for sending the packet from an interface on the first line card identified by a primary entry, if the primary entry corresponding to the unicast destination address is found during the egress lookup.

34. The system of claim 33, further comprising:
means for sending a notification via the virtual network device link if the destination identifier comprised in the header does not match a destination identifier comprised in the primary entry, wherein
the notification identifies the unicast destination address as corresponding to the destination identifier comprised in the primary entry.

35. The system of claim 33, wherein
the packet is only sent from the interface if the interface is not comprised in an uplink interface bundle.

36. The system of claim 31, further comprising:
means for receiving a second packet, the second packet comprising a multicast destination address; and
means for sending at most one copy of the second packet to one of the two virtual network device sub-units via the virtual network device link.

37. A non-transitory computer readable medium storing a program, the program comprising program instructions executable to:
detect reception of a packet via a virtual network device link, the packet comprising a unicast destination address, wherein
the virtual network device link couples a first virtual network device sub-unit and a second virtual network device sub-unit, and wherein
the first virtual network device sub-unit and the second virtual network device sub-unit are configured to operate as a single virtual network device within a network, and
the virtual network device is configured to perform Layer 2 forwarding to forward the packet to one or more network devices with in the network; and
perform an egress lookup for the packet in response to receipt of the packet, wherein
performing the egress lookup in a lookup table on a first line card comprises allocating a non-primary entry corresponding to a source address of the packet in the lookup table, if an entry corresponding to the source address has not already been allocated, wherein the non-primary entry indicates a second line card.

38. The computer readable medium of claim 37, wherein
a header associated with the packet is also received via the virtual network device link,
the header comprises a destination identifier.

39. The computer readable medium of claim 38,
wherein the program instructions are further executable to:
send the packet and the header to the second line card if a non-primary entry corresponding to the unicast destination address is found during the egress lookup.

40. The computer readable medium of claim 38,
wherein the program instructions are further executable to:
send the packet from an interface on the first line card identified by a primary entry, if the primary entry corresponding to the unicast destination address is found during the egress lookup.

41. The computer readable medium of claim 40, wherein the program instructions are further executable to:
send a notification via the virtual network device link if the destination identifier comprised in the header does not match a destination identifier comprised in the primary entry, wherein
the notification identifies the unicast destination address as corresponding to the destination identifier comprised in the primary entry.

42. The computer readable medium of claim 40, wherein
the packet is only sent from the interface if the interface is not comprised in an uplink interface bundle.

43. The computer readable medium of claim 38, wherein the program instructions are further executable to:
detect reception of a second packet, the second packet comprising a multicast destination address; and
send at most one copy of the second packet to a virtual network device sub-unit via a virtual network device link, the virtual network device sub-unit comprised in a virtual network device.

* * * * *